June 8, 1965  W. J. CALDWELL  3,187,784
AUTOMATIC HIGH-SPEED ARMATURE WINDING AND
COIL LEAD-INSERTING MACHINE
Filed Aug. 4, 1960  30 Sheets-Sheet 1

INVENTOR.
WASHINGTON J. CALDWELL
BY
ATTORNEYS

LEADS INSERTED BEFORE FIRST
FOUR COILS ARE WOUND

TRAILING LEADS OF FIRST FOUR COILS
ARE INSERTED AFTER COILS ARE
WOUND AND WIRE IS CUT

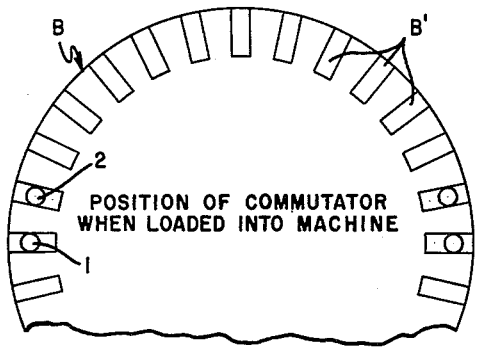

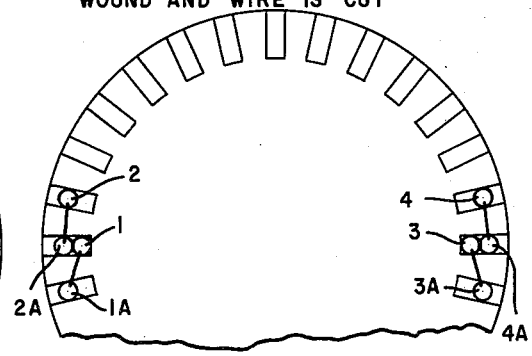

COMMUTATOR IS ROTATED TWO
SLOTS THEN LEADS OF SECOND FOUR
COILS TO BE WOUND ARE INSERTED

SECOND FOUR COILS ARE WOUND
THEN WIRE IS CUT AND TRAILING
LEADS OF SAID COILS ARE INSERTED

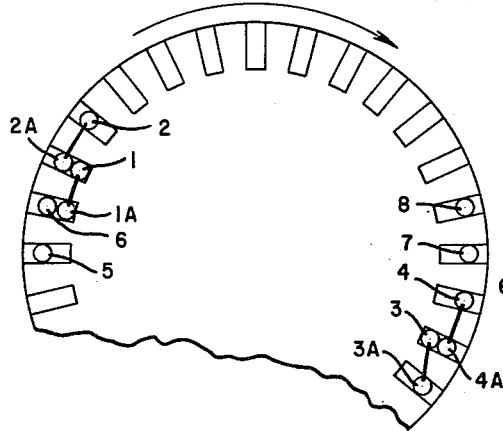

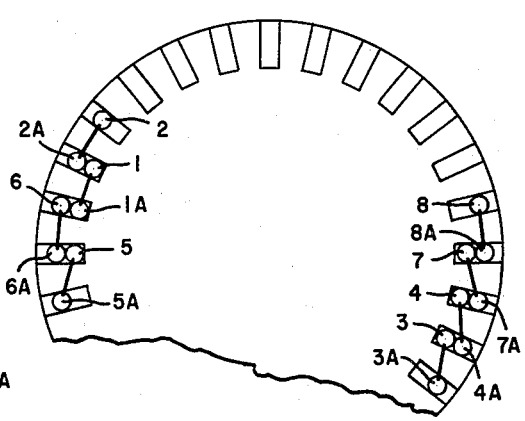

*INVENTOR.*
WASHINGTON J. CALDWELL
BY
Falvey, Souther & Stoltenberg
ATTORNEYS

June 8, 1965

W. J. CALDWELL 3,187,784

AUTOMATIC HIGH-SPEED ARMATURE WINDING AND
COIL LEAD-INSERTING MACHINE

Filed Aug. 4, 1960

INVENTOR.
WASHINGTON J. CALDWELL
BY
*Falvey, Souther & Stoltenberg*
ATTORNEYS

June 8, 1965 W. J. CALDWELL 3,187,784
AUTOMATIC HIGH-SPEED ARMATURE WINDING AND
COIL LEAD-INSERTING MACHINE
Filed Aug. 4, 1960 30 Sheets-Sheet 7

INVENTOR.
WASHINGTON J. CALDWELL
BY
Falvey, Souther & Stoltenberg
ATTORNEYS

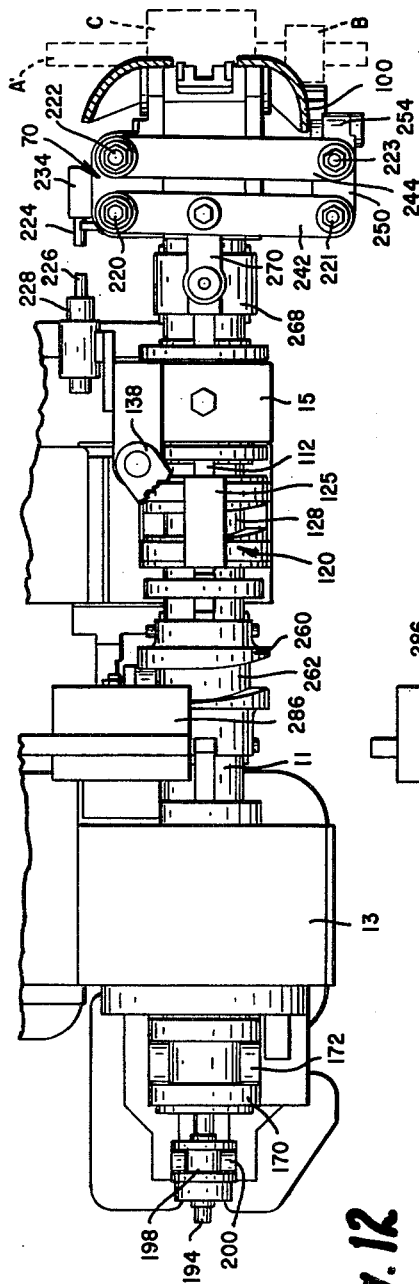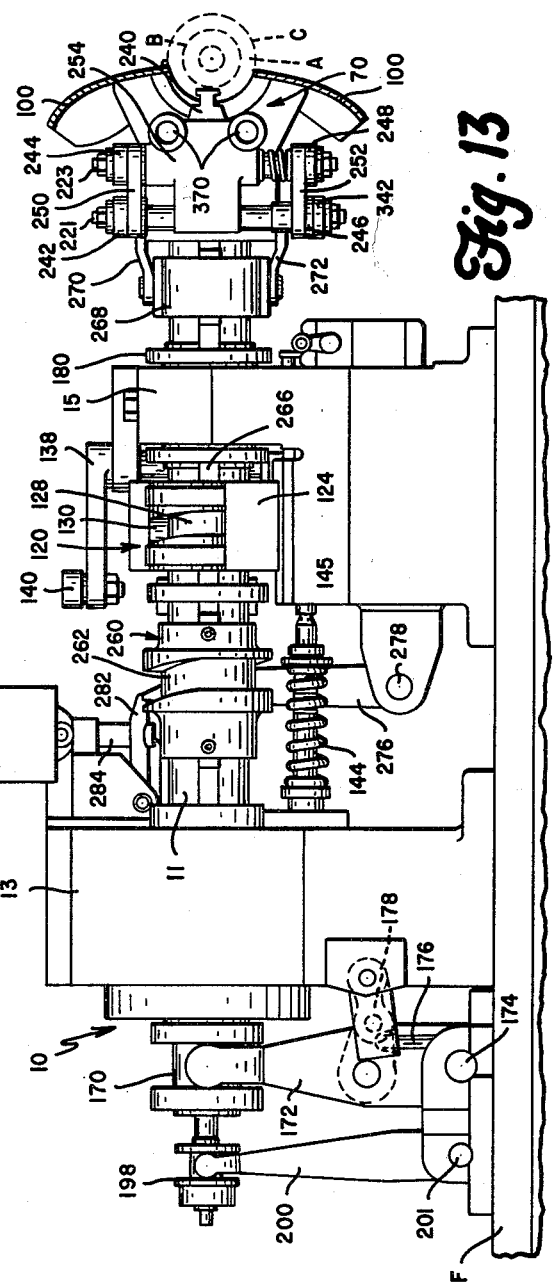

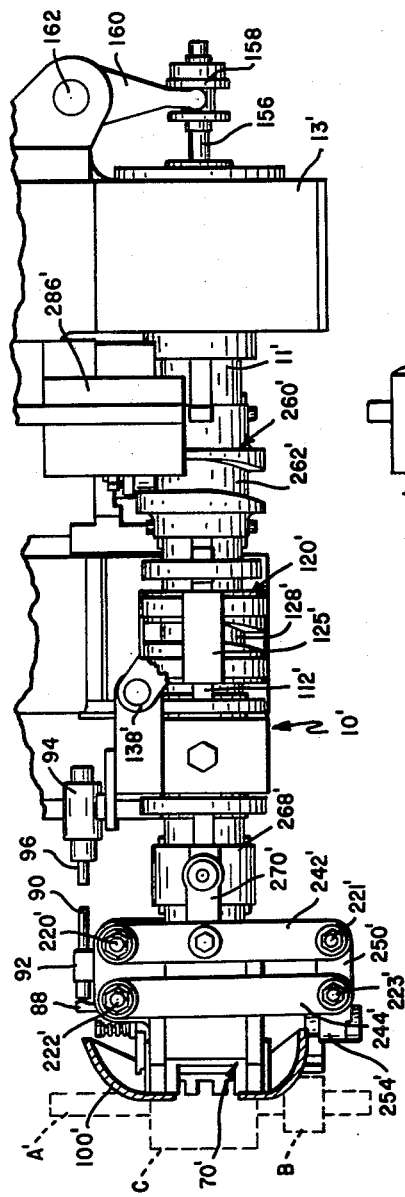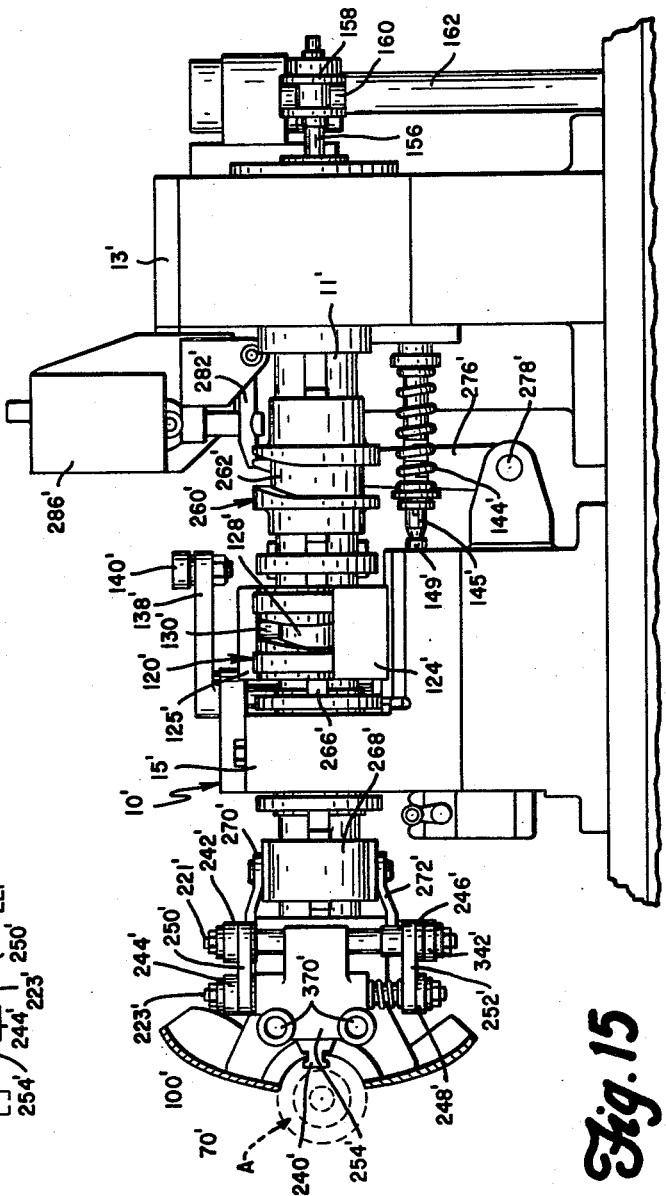
Fig. 14
Fig. 15
INVENTOR.
WASHINGTON J. CALDWELL

*INVENTOR.*
WASHINGTON J. CALDWELL
BY
*Falvey, Souther & Stoltenberg*
ATTORNEYS

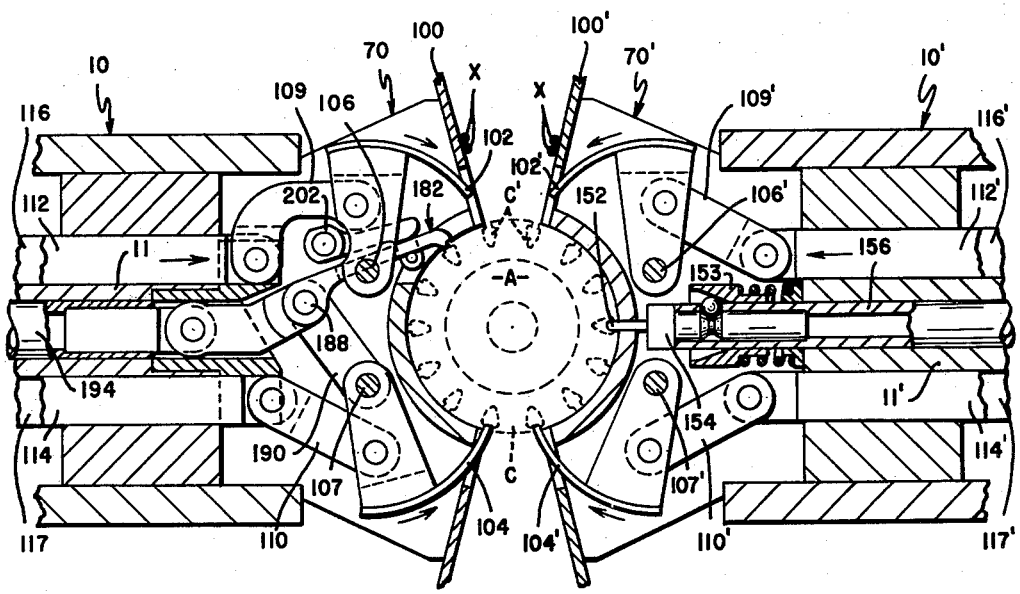

INVENTOR.
WASHINGTON J. CALDWELL
BY
Fabry, Gowther & Stoltenberg
ATTORNEYS

INVENTOR.
WASHINGTON J. CALDWELL
BY
Fahey, Souther & Stottenberg
ATTORNEYS

INVENTOR.
WASHINGTON J. CALDWELL
BY
*Falvey, Souther & Stoltenberg*
ATTORNEYS

INVENTOR.
WASHINGTON J. CALDWELL
BY
Falvey, Souther & Stoltenberg
ATTORNEYS

INVENTOR.
WASHINGTON J. CALDWELL
BY
Falvey, Souther & Stoltenberg
ATTORNEYS

INVENTOR.
WASHINGTON J. CALDWELL
BY
ATTORNEYS

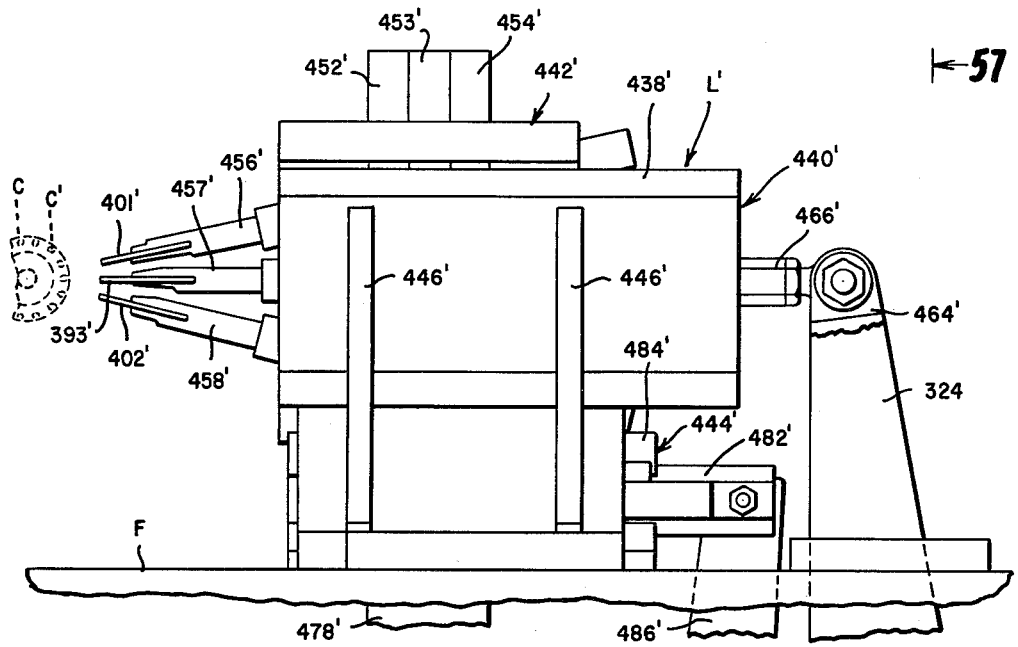
Fig. 56
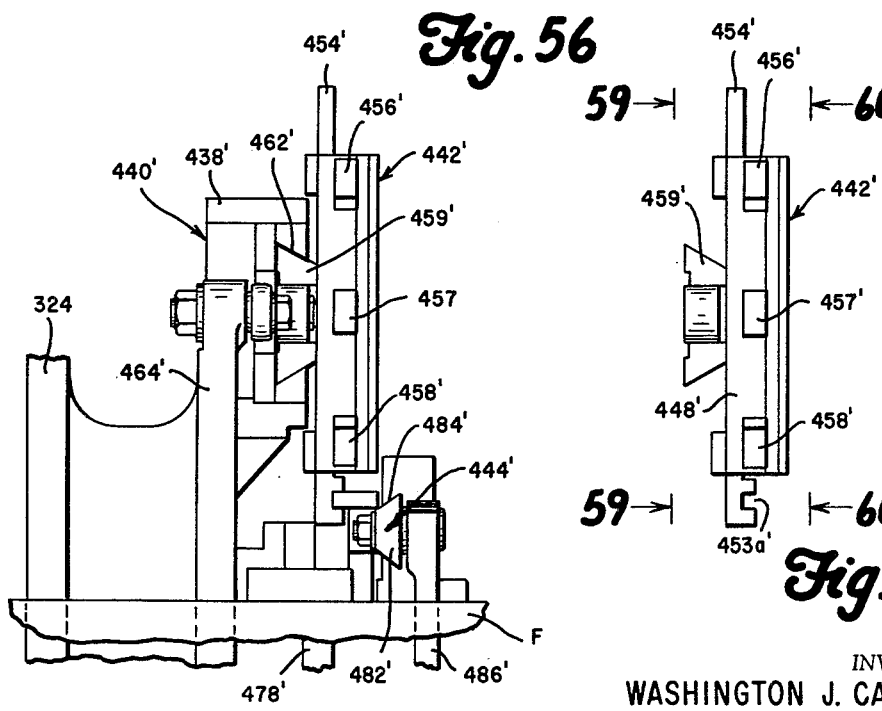
Fig. 57
Fig. 58
INVENTOR.
WASHINGTON J. CALDWELL
BY
Falvey, Souther & Stoltenberg
ATTORNEYS

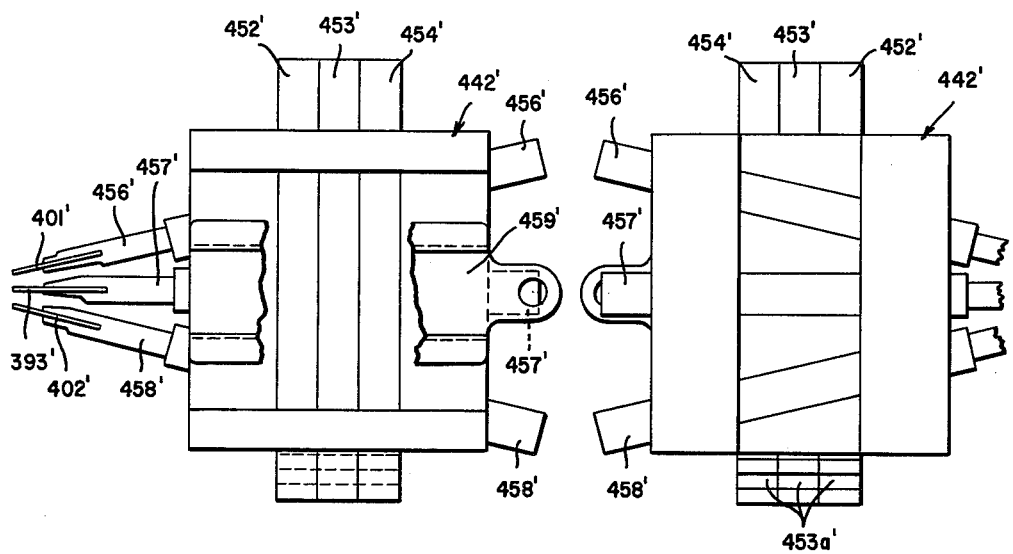
*Fig.* 59    *Fig.* 60
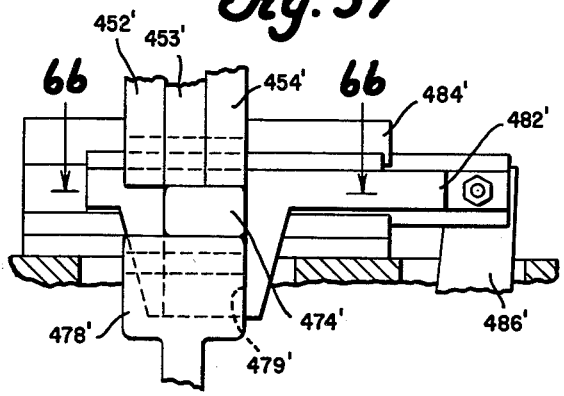
*Fig.* 62
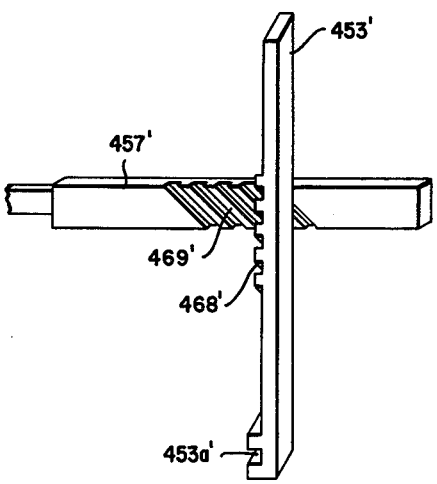
*Fig.* 61
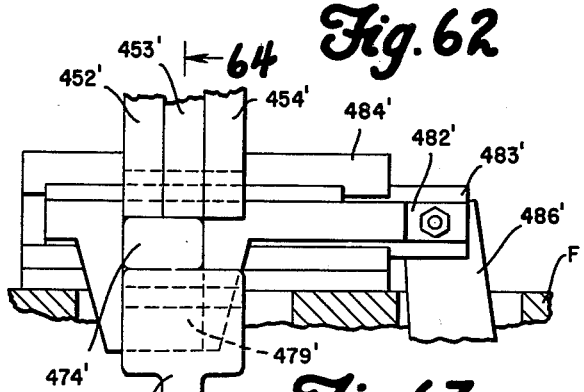
*Fig.* 63
INVENTOR.
WASHINGTON J. CALDWELL
BY
ATTORNEYS INVENTOR.
WASHINGTON J. CALDWELL
BY
Falvey, Souther & Stoltenberg
ATTORNEYS

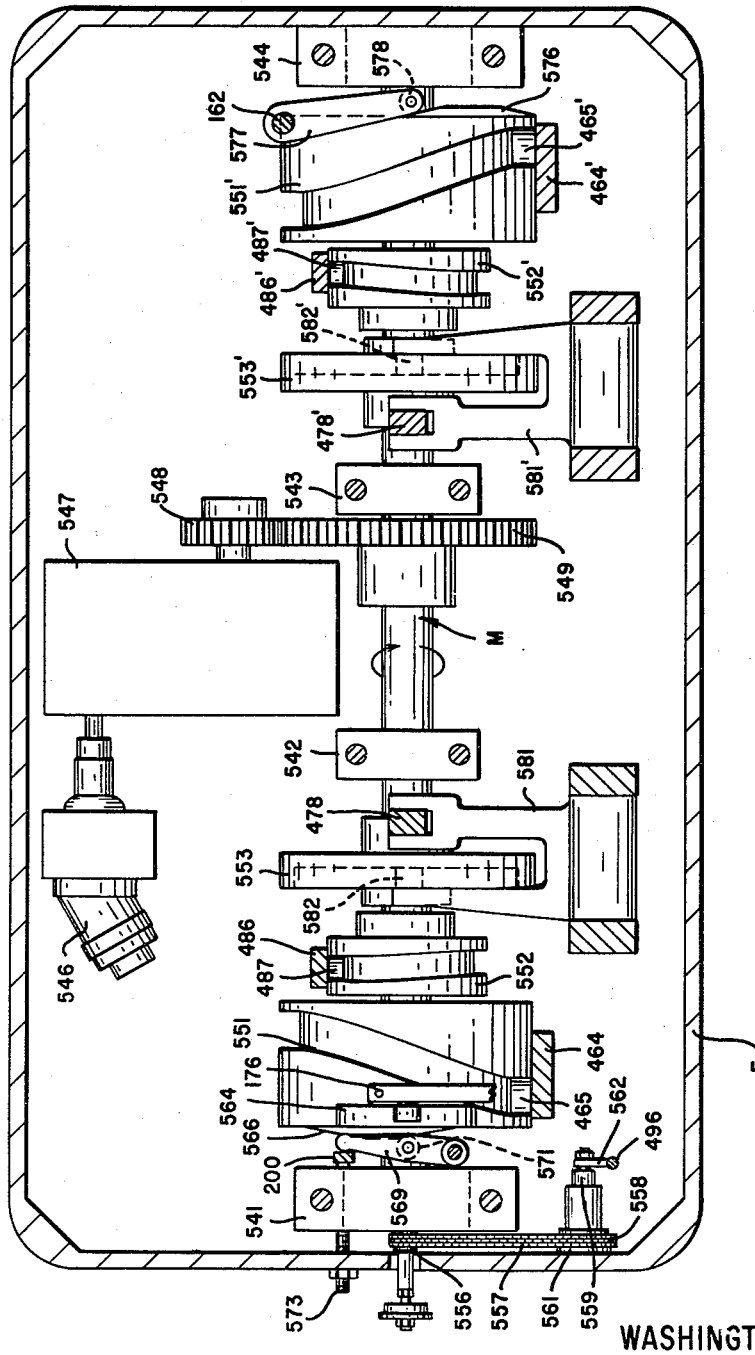

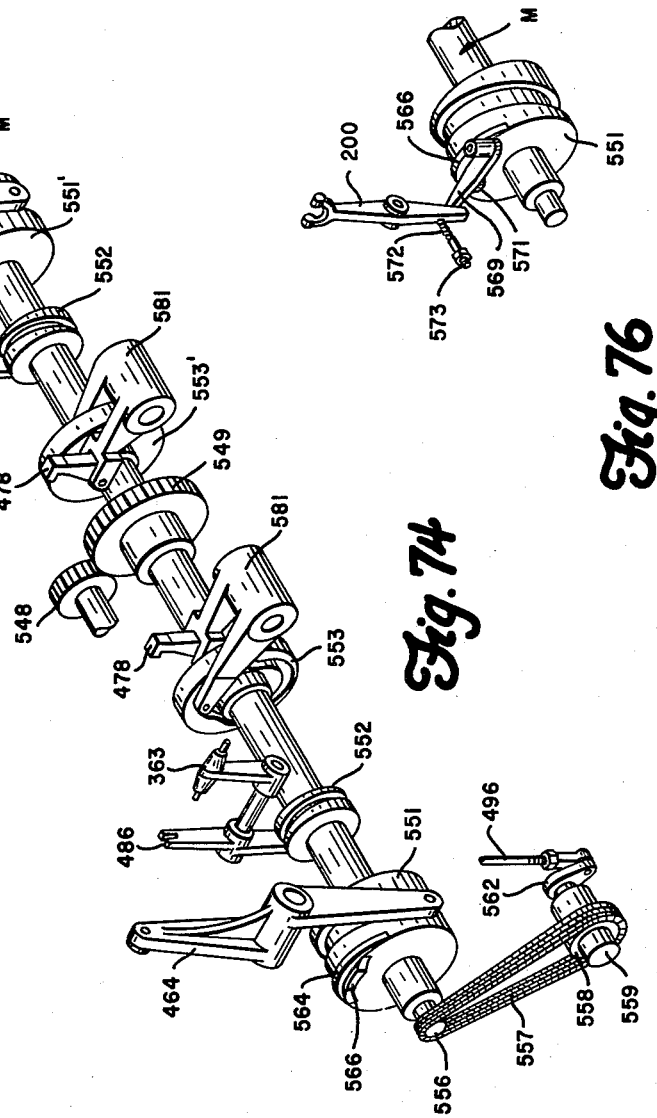
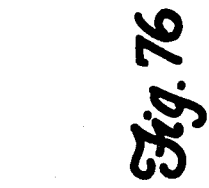

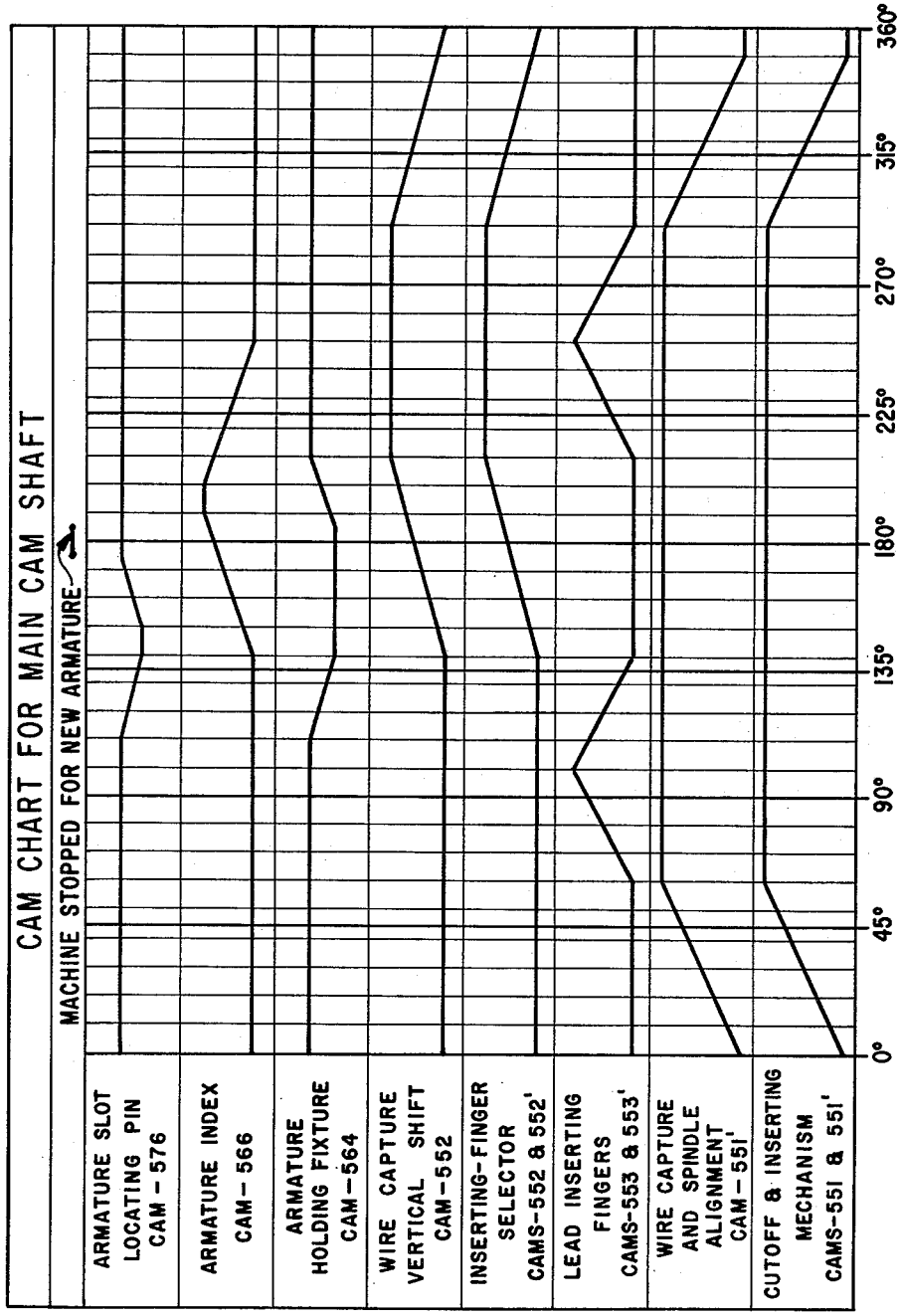

INVENTOR.
WASHINGTON J. CALDWELL

June 8, 1965

W. J. CALDWELL 3,187,784

AUTOMATIC HIGH-SPEED ARMATURE WINDING AND
COIL LEAD-INSERTING MACHINE

Filed Aug. 4, 1960

INVENTOR.
WASHINGTON J. CALDWELL
BY
Falvey, Souther & Stoltenberg
ATTORNEYS

United States Patent Office 3,187,784
Patented June 8, 1965

3,187,784
AUTOMATIC HIGH-SPEED ARMATURE WINDING
AND COIL LEAD-INSERTING MACHINE
Washington J. Caldwell, Toledo, Ohio, assignor to
Eltra Corporation, a corporation of Ohio
Filed Aug. 4, 1960, Ser. No. 47,471
18 Claims. (Cl. 140—71)

This invention relates to an armature winding machine and more particularly to an automatic high-speed armature winding and connecting machine.

The invention comprehends a machine which will operate automatically to produce, in one continuous operation, a completely wound armature having a given number of coils positioned thereon with all of the coil leads connected to their respective commutator segment slots.

The invention contemplates the provision of a high-speed armature winding machine which will wind four coils simultaneously on an armature core and connect the eight coil leads to the commutator slots during a single winding cycle, then automatically continue through a given number of cycles to produce a completely wound and connected armature.

The invention further contemplates the provision of an armature winding machine capable of carrying out a predetermined winding method to produce armatures having improved physical and electrical characteristics, and which are more economical to manufacture.

A number of methods have been devised in the past to reduce the manufacturing costs of a dynamo-electric armature and improve the characteristics of the armature, none of which are entirely satisfactory for present mass production requirements. One of the methods of producing an armature is to wind the coils directly on the armature in an end-over-end rotation then, in a later hand operation, connect the coil leads to the commutator slots. Another method is to form-wind the coils, position the preformed coils in the slots of the armature, then manually connect the coil leads to the commutator slots. A more recent method is to simultaneously wind two coils directly on the armature and connect the coil leads to the commutator slots by a machine operation as the winding opeartion progresses. The first two methods described are not desirable due to the cost of the manual operations necessary to connect the coil leads, which considerably increases the manufacturing costs. The last method set forth eliminates the manual operations but is still a slower operation than is desired since only two coils are wound and connected at a time.

It is, therefore, a principal object of the present invention to provide an automatic high-speed armature winding machine that will wind and connect all of the coils for a completely wound armature directly on an armature core in one continuous operation.

Another object of the invention is to provide an automatic high-speed armature winding machine capable of winding coils directly on the armature core from continuous strands of wire which also connects all of the coil leads into appropriate commutator segment slots without the need of manual attention or handling during the winding and connecting operation.

Another object of the invention is to provide an automatic high-speed armature windinug machine capable of continuous operation utilizing predetermined coil winding and connecting pattern on an armature core which results in an armature having improved electrical and physical characteristics and which is more economical to manufacture.

Another object of the invention is to provide a high-speed armature winding machine which will function automatically and continuously through a predetermined number of winding cycles from continuous strands of wire to produce a completely-wound armature, one winding cycle comprising simultaneously winding four coils and inserting the eight coil leads, four on the leading ends of the coils, and four on the trailing ends into slots provided in the associated commutator segments.

Another object of the invention is to provide an automatic armature winding machine capable of winding and connecting from four continuous strands of wire four coils simultaneously, two of the coils being wound in core slots in one half of the armature while the other two coils are being wound in core slots in the opposite half of the armature, so that the armature core is rotated through an arc of one hundred and eighty degrees to complete the winding cycle.

Another object of the invention is to provide an automatic high-speed armature winding machine capable of inserting the leading ends of four continuous strands of wire in appropriate commutator slots, two on each of the opposite sides of the communtator, then simultaneously winding four coils in slots in the armature core, and then inserting the four trailing leads of the coils in separate commutator slots, two on each of the opposite sides of the commutator, while maintaining a grip on the free ends of the four continuous strands ready to begin a new winding cycle.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. 3 is a schematic view showing the beginning of a winding operation with the leading ends of four continuous strands inserted in four commutator slots;

FIG. 3A is a schematic view representing the commutator after four coils have been wound on the armature and all eight leads have been inserted in the commutator slots.

FIG. 4 is a schematic view of the commutator with the four leading ends of the continuous strands inserted in the commutator for beginning a second set of four coils;

FIG. 4A is a similar view of the commutator after eight coils have been wound and sixteen coil leads have been inserted in the commutator slots;

FIG. 12 is a top plan view of an independent assembly constituting one half of a spindle mechanism;

FIG. 13 is a side elevational view of the assembly shown in FIG. 12;

FIG. 14 is a top plan view of an independent assembly similar to the view shown in FIG. 12 and constituting the other half of the spindle mechanism;

FIG. 15 is an elevational view of the assembly shown in FIG. 14;

FIGS. 20, 21 and 22 are sectional views of a portion of the spindle mechanism showing the armature-holding fixture with various related parts in different operating positions;

FIG. 56 is a side elevation of the wire cutoff and lead-inserting mechanism;

FIG. 57 is an end elevation taken on line 57—57 of FIG. 56;

FIG. 58 is an end elevation of a portion removed from the assembly shown in FIG. 57;

FIG. 59 is a side elevation taken on line 59—59 of FIG. 58;

FIG. 60 is a side elevation taken on line 60—60 of FIG. 58;

FIG. 61 is an isometric exploded view of two cooperating elements shown in FIGS. 59 and 60;

FIG. 62 is a side elevation, partly in section, of a vertical and horizontal operating assembly shown in FIG. 56;

FIG. 63 is a view, similar to FIG. 62, showing various elements in different operating position;

FIG. 73 is a top plan view with the top surface of the machine frame cut away showing a main cam shaft and related elements;

FIG. 74 is an isometric view of the main cam shaft and various related elements shown in FIG. 73;

FIG. 75 is an isometric view of a portion of the main cam shaft with an additional related element;

FIG. 76 is an isometric view of the same portion shown in FIG. 75 including a different related element;

FIG. 77 is a cam chart showing the function of the various cams with relation to an initial winding operation;

A machine incorporating the present invention is designed to wind and connect the active coils of an armature for a dynamo electric machine such as a generator armature suitable for use with automoibles, from continuous strands of wire, continuously at a high rate of speed. An operator of the machine feeds armature cores to the machine on one side, or armature cores can be fed to the machine automatically by a feeding and indexing device, and the machine will automatically wind all of the active coils on the armature core and connect all of their leads to the commutator bars to provide a complete armature ready for further processing, such as soldering, turning etc. The completely wound and connected armature may be automatically ejected from the machine into a conveying apparatus for further processing.

The machine comprises several separate operating assemblies designed to function in a given sequence. The various assemblies will repeat the sequence several times until the winding operation is completed. The term "winding operation," as used hereinafter, will refer to the complete winding of a dynamo-electric machine armature, and a single sequence for winding a single active coil will be referred to as a "winding cycle." A winding cycle consists of winding four coils simultaneously on an armature frame from four continous strands and inserting the eight coil leads in their relative commutator segment slots. The entire machine operates automatically at high speed from the time an armature frame is placed in the machine until the armature is completely wound and all of the coil leads have been inserted in their respective commutator slots.

Several winding cycles are necessary to completely wind an armature, depending on the size of the armature required for a specific dynamo-electric machine. For the purpose of presentation only, the description and the drawings apply to an armature having twenty-eight coils, fourteen core slots, and twenty-eight commutator segments. The machine can be adapted to wind armatures of various sizes.

In the description, the construction and operation of the separate operating assemblies will be described, as near as possible, in the sequence in which they happen during a single winding cycle. In some of the assemblies, similar parts will be found on opposite sides of the machine and performing identical functions. For the purpose of clarity and simplification in the description, these similar parts will be identified with corresponding numbers, one of which will be a prime number.

Figure 1:
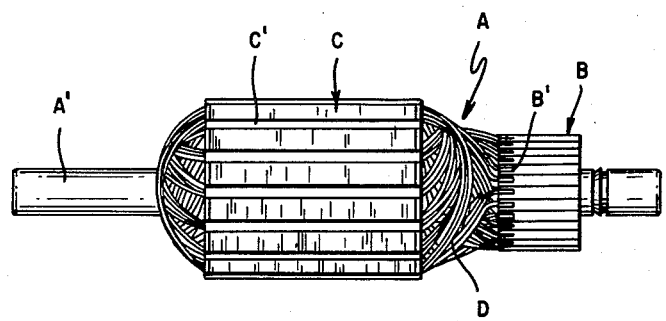
FIG. 1 is a side elevation of a dynamo-electric machine armature of the type involved in the present invention.

In the drawings, particularly FIG. 1, an armature A is shown comprising a shaft A', a commutator B having commutator slots B', in each of its segments, an armature core C having coil-retaining slots C', and a number of active coils D. In FIGS. 2, 3, 3A, 4, and 4A schematic views are shown representing an imaginary section through the connecting end of the commutator B showing the commutator slots B'. The schematic views show the sequence of connecting the coil leads to the commutator B and the connecting pattern developed by the machine in the slots B'.

In the connecting sequence, the first four leads 1, 2, 3, and 4, which are actually the free ends of four continuous strands of wire (FIG. 3) are inserted into the slots B' simultaneously by an inserting mechanism of the machine. Immediately after the leads are inserted, the armature A is rotated in an end-over-end fashion by the machine to simultaneously wind four coils on the armature core C from the four continuous strands. Two coils are wound on each of the opposite sides of the armature at the same time and positioned in four core slots C'. After a predetermined number of turns have been wound, the armature is stopped and the trailing leads 1A, 2A, 3A, and 4A of the first four coils are cut free from the continuous strands and inserted into their respective commutator slots B', as shown in FIG. 3A. The machine retains a grip on the four new ends of the continuous wire strands. The armature A is then indexed by the machine in a clockwise direction, as shown in FIG. 4, a distance of two commutator slots. The commutator B is now in a position to have inserted the new ends of the four continuous strands to form four new leads 5, 6, 7, and 8 of the next four coils to be wound on the armature. After the ends are inserted in the commutator slots, the second set of four coils are wound in the same fashion as the first set of four coils. When the armature is stopped, the trailing leads 5A, 6A, 7A and 8A of the second set of coils are inserted in their respective slots B', as shown in FIG. 4A. The armature is again indexed in a clockwise direction a distance of two commutator slots and the third winding cycle begins by inserting the new ends of the continuous strands to form a third set of leads.

Figure 2:
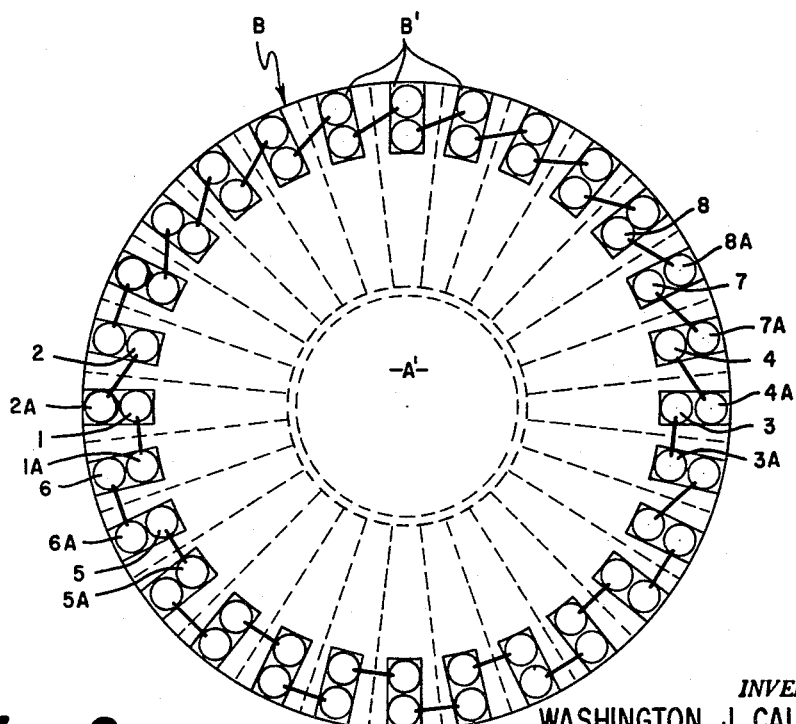
FIG. 2 is a schematic view showing the pattern developed by the machine incorporating the invention when connecting the coil leads to the commutator segments of an armature.

These winding cycles will continue until twenty-eight coils have been positioned on the armature, as shown in FIG. 2, after which the completed armature is automatically ejected from the machine. A new armature assembly is then placed in the machine and another series of winding cycles are repeated in the same sequence as described. It is to be remembered that a winding cycle consists of inserting four ends, winding four coils, then inserting four trailing leads while maintaining a grip on the new ends of the four continuous strands. Also, the armature is always indexed in the same direction a ditsance of two commutator slots between each winding cycle.

Figure 5:
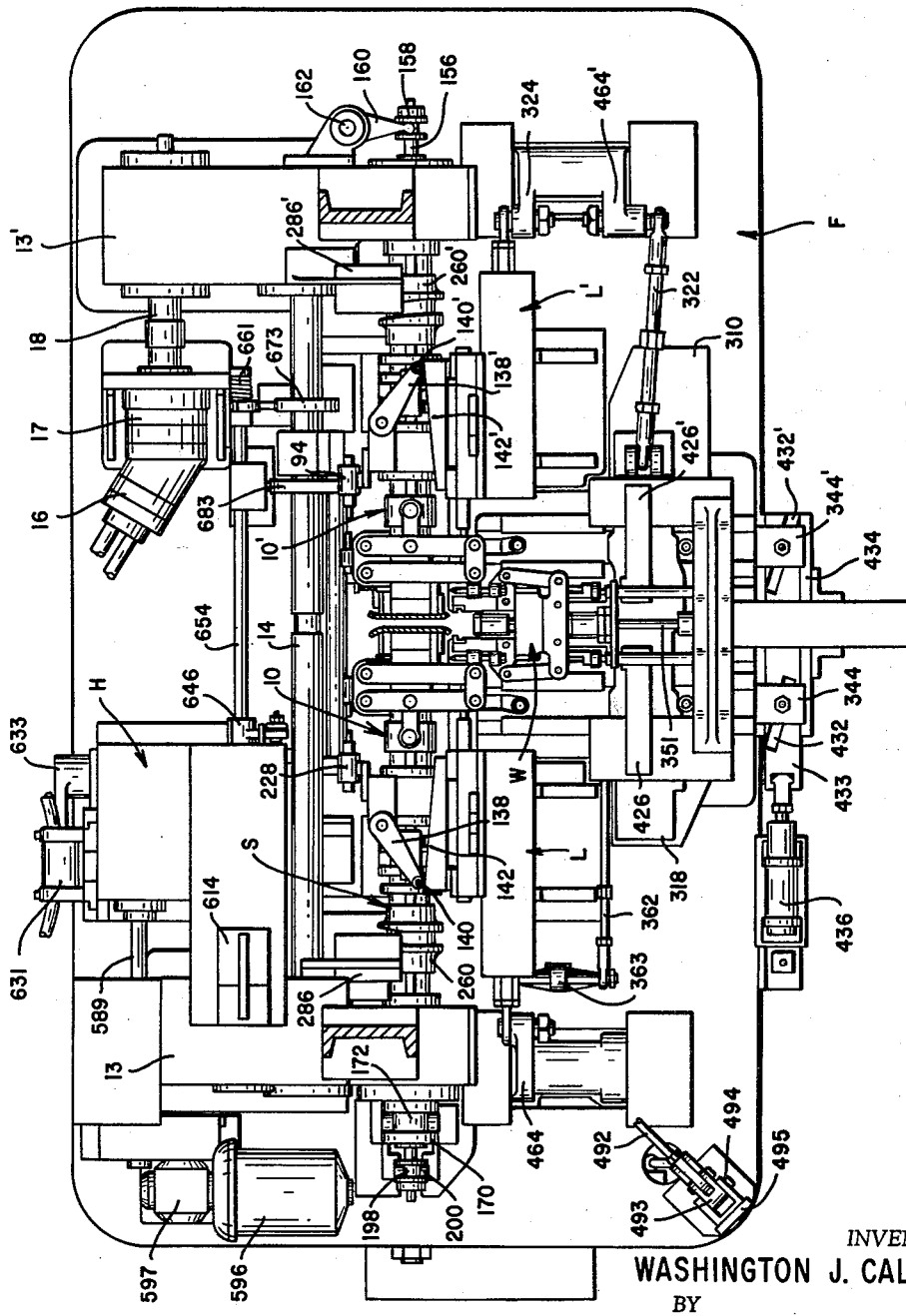
FIG. 5 is a top plan view of the machine with a wire changeover mechanism removed.
Figure 6:
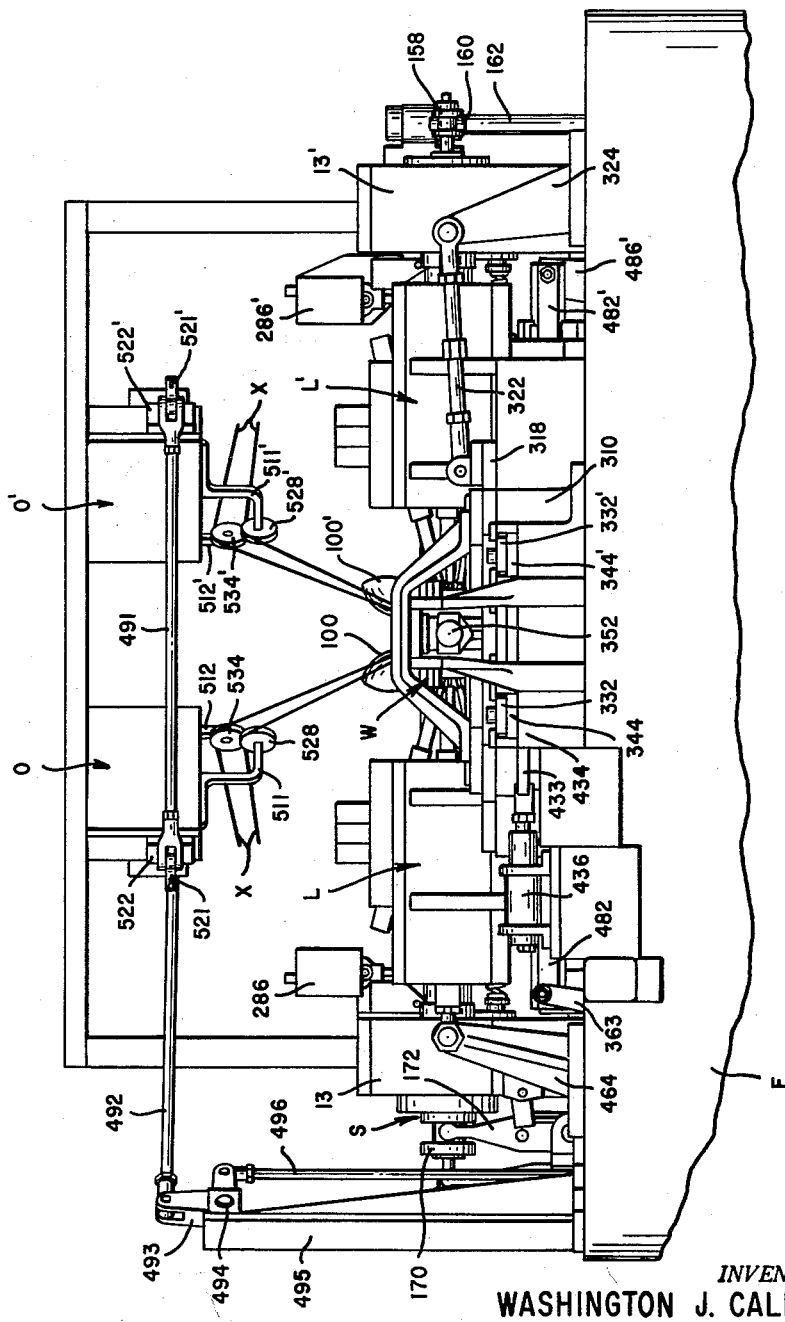
FIG. 6 is a side elevation of the machine including the wire change-over mechanism.
Figure 7:
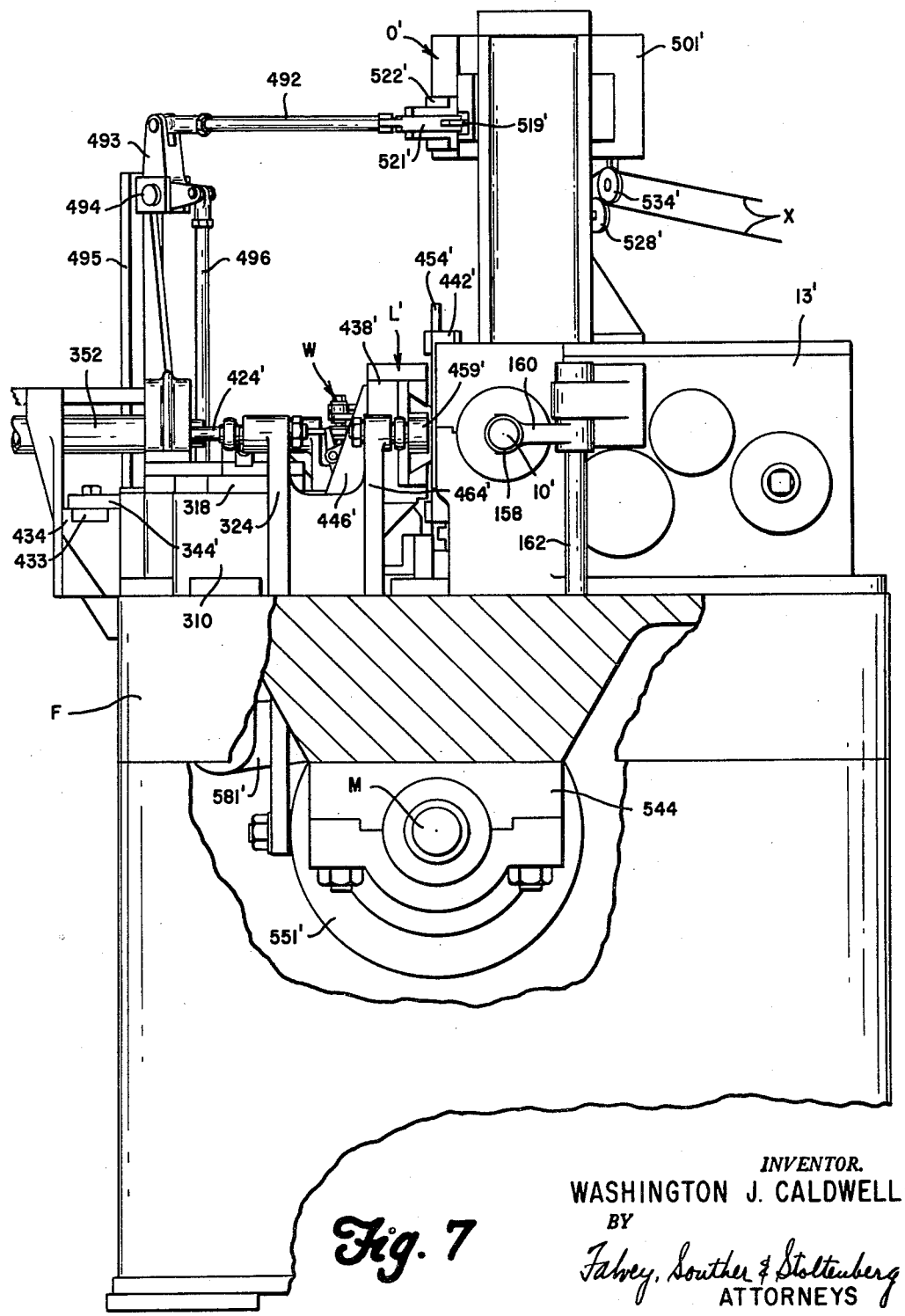
FIG. 7 is a right end elevation of the machine, as viewed in FIG. 6.
Figure 8:
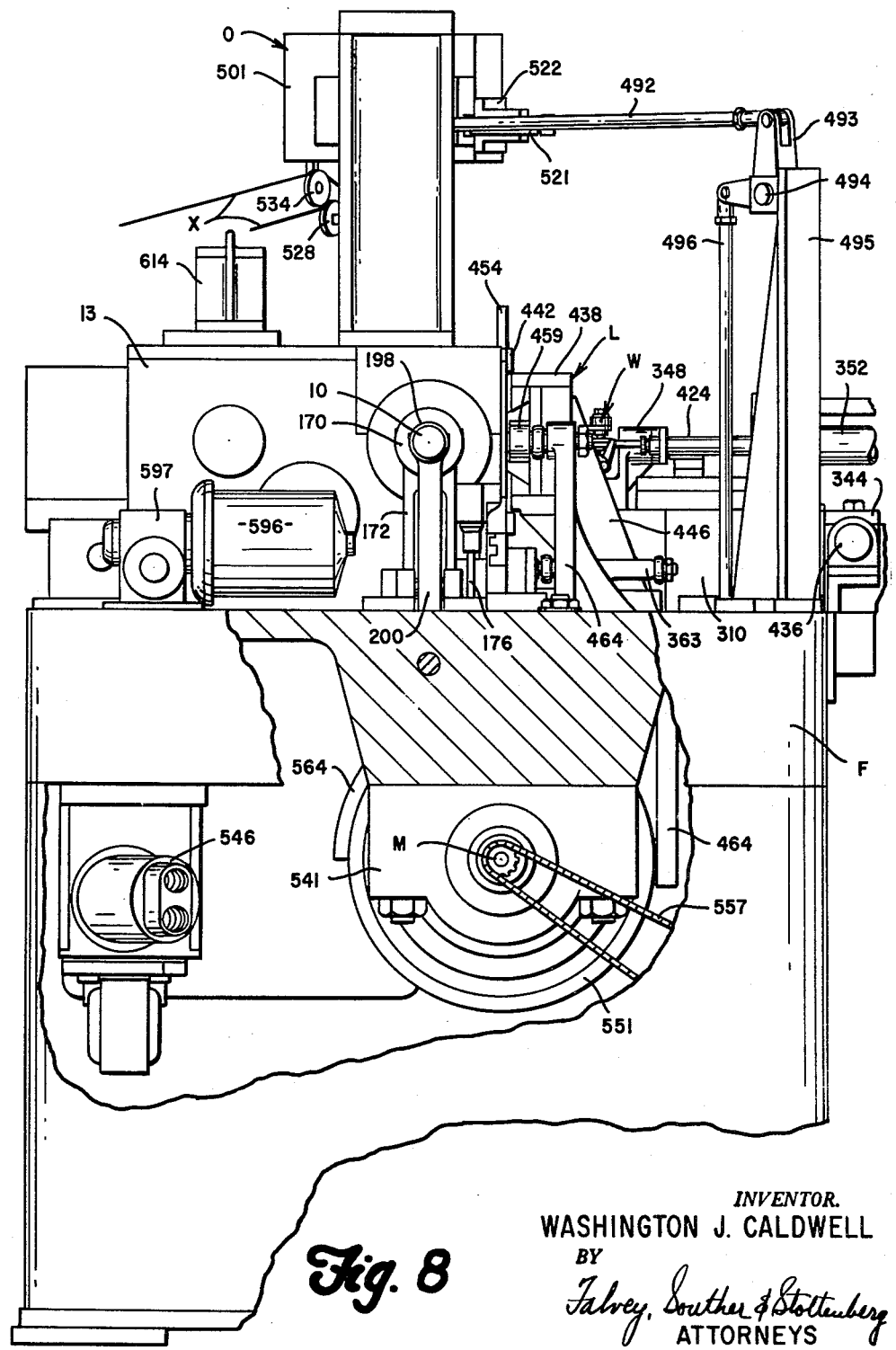
FIG. 8 is a left end elevation of the machine, as viewed in FIG. 6.

In FIGS. 5, 6, 7, and 8, an armature winding machine to perform these operations is shown, comprising a mounting frame F upon which is mounted a rotatable spindle mechanism S, a commutator slot selector and spindle alignment assembly W, and two coil lead inserting and cutoff assemblies L and L'. A decelerating mechanism H is also mounted on the frame F which controls the speed before stopping the rotatable spindle mechanism S. Two wire changeover mechanisms O and O' are mounted above the spindle S and a main cam shaft assembly M is mounted inside of the frame F, as shown in FIGS. 6, 7 and 8. These assemblies constitute the "separate operating assemblies" referred to hereinabove, the details of which will now be described.

*Spindle driving means*

Figure 10:
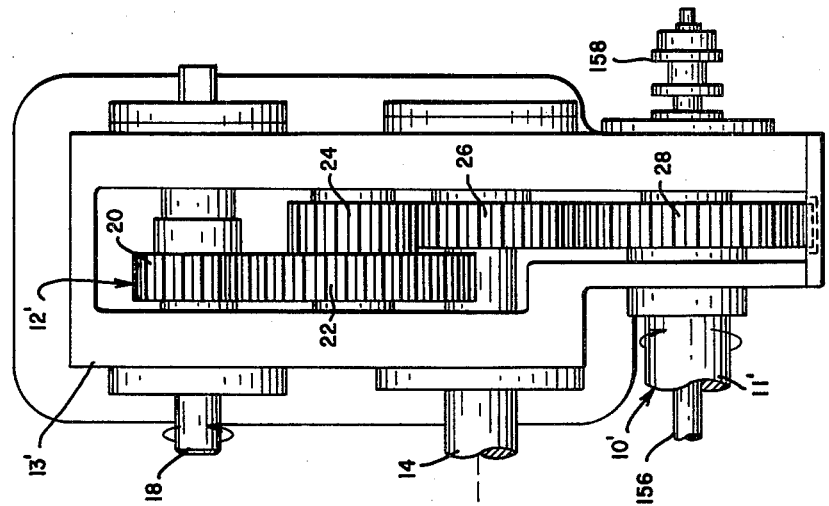
FIG. 10 is a similar view showing a similar gear box and driving gear assembly.
Figure 9:
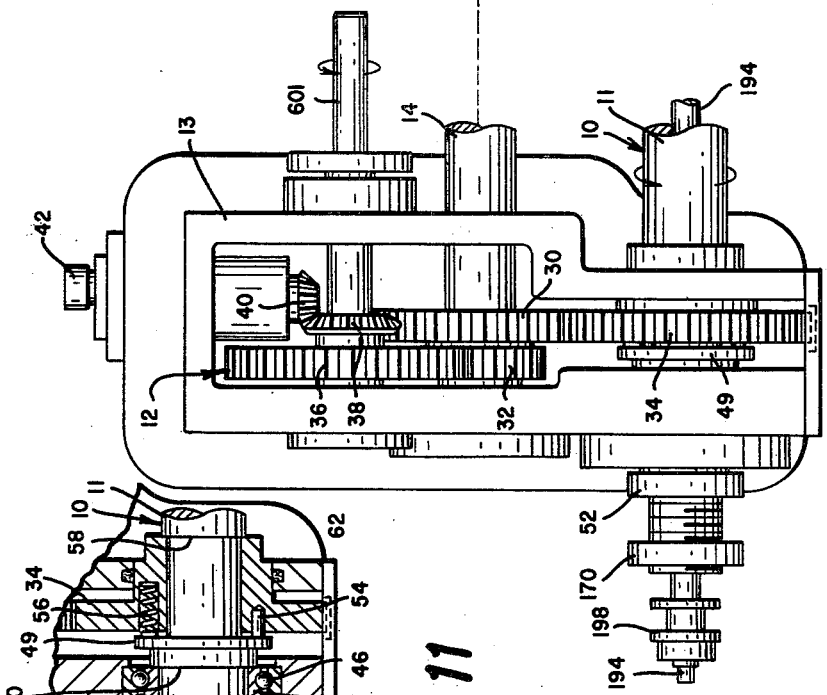
FIG. 9 is a top plan view of a gear box showing the details of a driving gear assembly.

Beginning with the spindle mechanism generally designated as S, two separate assemblies 10 and 10' are shown, one assembly is located on each side of the machine in aligned relation to cooperate with an armature adjacent a central location. The purpose of the divided spindle mechanism is to hold an armature between the two assemblies 10 and 10' for movement to various positions during the winding operation and to rotate the armature in an end-over-end fashion to wind coils on the armature core. The two separate spindle assemblies 10 and 10' are rotated individually by two enclosed gear assemblies 12 and 12', (FIGS. 5 through 15) which are interconnected and locked together through shaft 14 to rotate the two separate spindle assemblies together in synchronism. The driving power for the spindle rotation is supplied by a hydraulic motor 16 (FIG. 5) connected to a shaft 18 of gear assembly 12'. In FIGS. 9 and 10, enlarged views are shown of the two gear assemblies 12 and 12' showing their individual gear trains.

Figure 11:
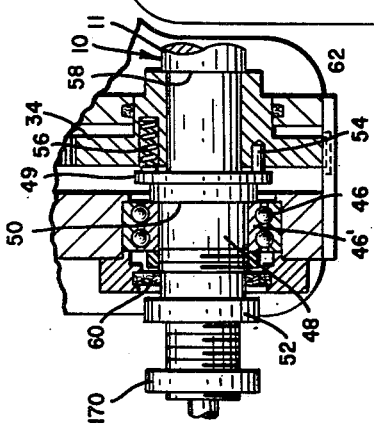
FIG. 11 is a sectional view of a portion of the mechanism shown in FIG. 9.
Figure 16:
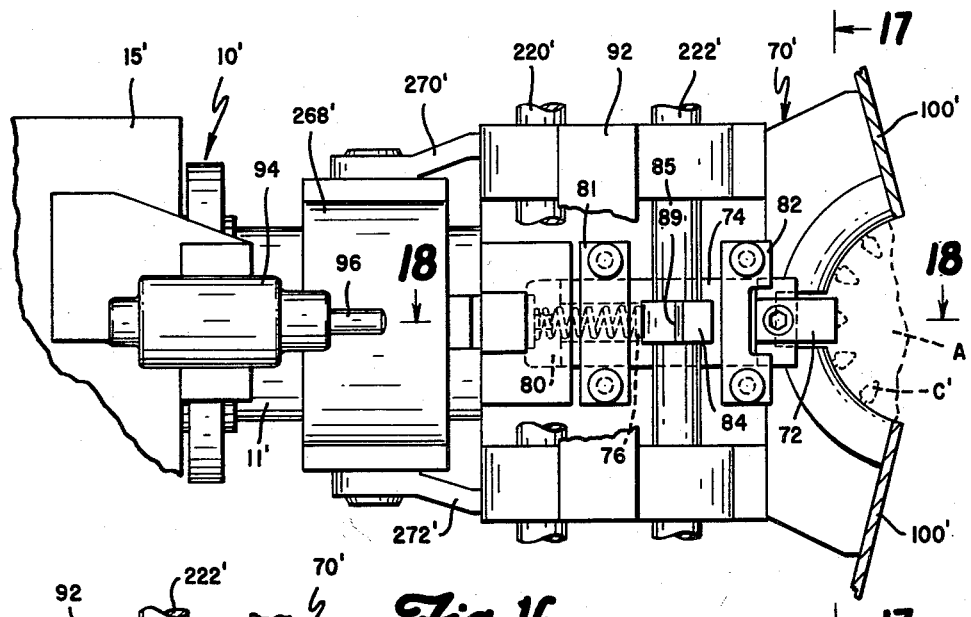
FIG. 16 is an enlarged view of a portion of the spindle mechanism showing the armature holding and retaining means.
Figure 17:
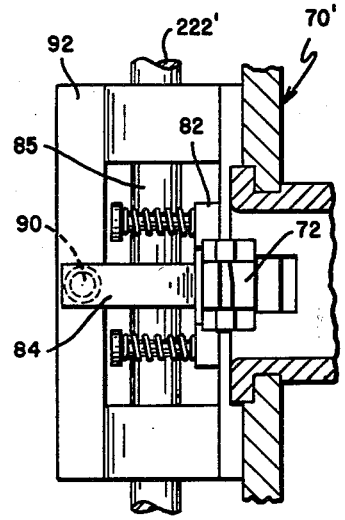
FIG. 17 is an elevational view, partly in section, taken on line 17—17 of FIG. 16.

Shaft 18 being driven by the hydraulic motor 16 through a conventional gear reduction unit 17, rotates gear 20, idler reduction gears 22 and 24, gear 26 and gear 28. Gear 28 is keyed to shaft 11' of spindle 10' causing the spindle to rotate in the direction of the arrow shown in FIG. 10. Gear 26 is mounted on one end of shaft 14, which transmits the driving power to gear assembly 12 (FIGS. 9 and 11). The end of shaft 14 in gear assembly 12 has mounted thereon gears 30 and 32; gear 30 transmitting power to shaft 11 of spindle 10 through gear 34. Gear 32 transmits rotative power to a timing mechanism (not shown) through gear 36 and bevel gears 38, and 40 to rotate an eccentrically-mounted roller cam 42. The timing mechanism referred to is a conventional means to control a machine through a given number of cycles and therefore will not be described further hereinafter. Gear 34 rotates the spindle assembly 10 in the same direction, and at the same speed as spindle assembly 10'. The gears in the assemblies 12 and 12' are housed in oil-filled gear boxes 13 and 13', all of the gear shafts are supported with suitable bearings mounted in the gear-box walls along with suitable oil retainers.

A means is shown in FIG. 11 whereby the spindle assembly 10 may be moved longitudinally without sliding shaft 11 through the inner race of a ball bearing 46. A sleeve bearing 48 is provided in the ball bearing 46 having an integral collar 50 on its inner end and a nut 52 threaded on the opposite outer end to hold the sleeve bearing 48 and the ball bearing 46 in assembled relation. A bearing assembly constructed as shown allows a slight longitudinal movement required of spindle 10 (the reason for which will be explained hereinafter) and also provides a rotary bearing support for one end of the spindle. Rotary motion is transmitted to the sleeve bearing by a sliding pin connection 54 between an integral flange 49, of sleeve 48, and gear 34. Although gear 34 is keyed to shaft 11, it may tend to relocate itself when the spindle is moved longitudinally. To prevent this from happening, a number of springs 56 are provided, bearing against the face of flange 49 and urging the hub of gear 34 against an integral collar 58 of shaft 11. This arrangement assures that gear 34 will remain in a given mesh position in line with gear 30 (FIG. 9) after the spindle 10 has been moved to the left and returned, with reference to the drawing. Springs 56 also assist to return the spindle assembly to its original position after it has been moved longitudinally to the left. It should be noted that the spindle moves longitudinally, only when the gears are not rotating. Furthermore, the longitudinal motion of the spindle and the bearing construction described pertain only to spindle 10, and not 10', which will be better understood from further description of the spindle operation. Because the gears operate in oil, retainers 60 and 62 are also provided, cooperating with spindle shaft 11 to prevent oil leakage.

*Spindle mechanism and operation*

It was found expedient for clarity to show views of the assembled spindle mechanism on two pages. So that a better understanding of the description and the drawings will be had, place FIGS. 14 and 15 to the right of FIGS. 12 and 13. This provides a full elevational view (FIGS. 13 and 15) and a full top view (FIGS. 12 and 14) of the entire spindle mechanisms comprising spindle assemblies 10 and 10'.

The spindle assemblies, FIGS. 12 through 31, which are rotatively supported at one end in suitable bearings located in the gear assemblies 12 and 12', are also rotatively supported at their opposite ends on bearing blocks 15 and 15'. The ends of the spindle assemblies at the center of the machine are each provided with an armature holding fixture 70 and 70', which cooperate with each other to hold an armature A (shown in phantom) between them. The fixtures 70 and 70' comprise several operating mechanisms, including a locking means to hold the armatures A in the fixtures.

Figure 18:
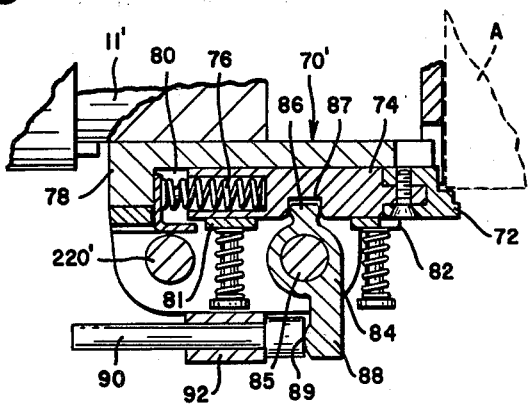
FIG. 18 is a plan view, partly in section, taken on line 18—18 of FIG. 16.
Figure 19:
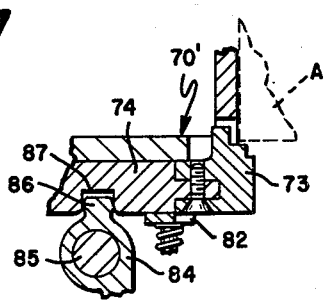
FIG. 19 is a sectional view showing an alternate form of the retaining means shown in FIG. 18.

Referring now to FIGS. 16, 17, 18 and 19, when an armature is placed in the armature holding fixtures 70 and 70' of the spindle mechanism, a spring-urged locking means is released locking the armature in the fixtures by contacting the armature core A as shown best in FIG. 18. The lock prevents the armature from being thrown out as a result of centrifugal forces developed when the spindle is rotated at high speed. Also, the lock prevents the pulling forces of the wire from dislocating the armature during the winding operation.

The lock assembly is located on one side of the spindle fixture 70' and consists of a retaining member 72 removably mounted on a sliding bar 74 spring urged toward the armature by a compressed coil spring 76 bearing against an integral projection 78 of fixture 70'. Bar 74 is guided in a groove 80 provided in the wall of the fixture 70' and is held in the groove 80 in a sliding relation by two spring-urged bars 81 and 82. An actuating means is provided by a member 84 pivotally mounted on a stud 85 which provides a means of moving the bar 74 against the action of spring 76. A projection 86 is provided on member 84 having rounded edges which cooperate with an indentation 87 in bar 74 providing a connection to move bar 74 longitudinally. A second projection 88 is provided on member 84 having a rounded surface 89 which bears against the head of a pin 90 slidingly mounted in a vertical bar 92 mounted to fixture 70'. A conventional piston type air cylinder 94 is mounted in fixed relation on the bearing mount of the spindle assembly in such a position that its projecting pin 96 is in striking alignment with pin 90 of the locking mechanism when the mechanism is stationary in loading position.

In the operation, when an armature A is to be placed in the cooperating holding fixtures 70 and 70', cylinder 94 is actuated causing pin 96 to strike pin 90. Pin 90 pushes projection 88, pivoting member 84 about stud 85. This action is transmitted through projection 86 to indentation 87 forcing bar 74 to the left, as viewed in FIG. 18. Retaining member 72 being mounted on bar 74 is also moved to the left clearing the opening in the fixture 70'. After the armature is placed in the fixture, the pin 96 of the air cylinder 94 is retracted, releasing the pin 90. The compressed coil spring then pushes bar 74 and the retaining member 72 to the right, locking the armature in the fixture by contacting the armature (FIG. 18).

An important feature of the present winding machine is that it is capable of winding coils on armature having various core lengths. Retainer 72 has been made removable to allow adjustments, and may be replaced by various size retainers such as the retainer 73, shown in FIG. 19, which is adapted to fit a specific core length. This is the only change necessary in the machine to adapt it to wind armatures of various core lengths.

After the armature A is locked in position between the holding fixtures 70 and 70', the lead inserting mechanisms L and L' are operated (FIG. 6) to insert the ends of four continuous wires X in four commutator slots B', the details and operation of which will be described hereinafter. After the continuous wire ends are inserted, the armature is ready to be rotated in an end-over-end fashion by the spindle mechanisms to wind four coils thereon, positioning them in two pairs of adjacent core slots C' of the armature core C.

To guide the pairs of continuous wires X into the armature core slots C', guide wings 100 and 100' are provided on the fixtures 70 and 70'. The wire is supplied to the machine on a spool, or in a drum, so that each wire tends to assume a bowed configuration as it is positioned in the core slots C', which must be eliminated to provide sufficient space for additional coils, and also to provide a tightly-wound armature. Arcuate tamping fingers (FIG. 20) 102, 102', 104 and 104' are provided for this purpose positioned behind the wings 100 and 100' and are operated immediately after the two pairs of wires are guided into the individual core slots. The tamping fingers are oscillated about pivots 106, 106', 107 and 107', by an actuating means consisting of sliding horizontal bars 112, 112', 114 and 114' and interconnecting links 109, 109', 110 and 110'. The sliding horizontal bars are guided in grooves 116, 116', 117 and 117' provided in the rotating shafts 11 and 11' of the spindle assemblies 10 and 10'. The motive means for bars 112, 112', 114 and 114' is provided by camming mechanisms 120 and 120' (FIGS. 12 through 15).

Figure 23:
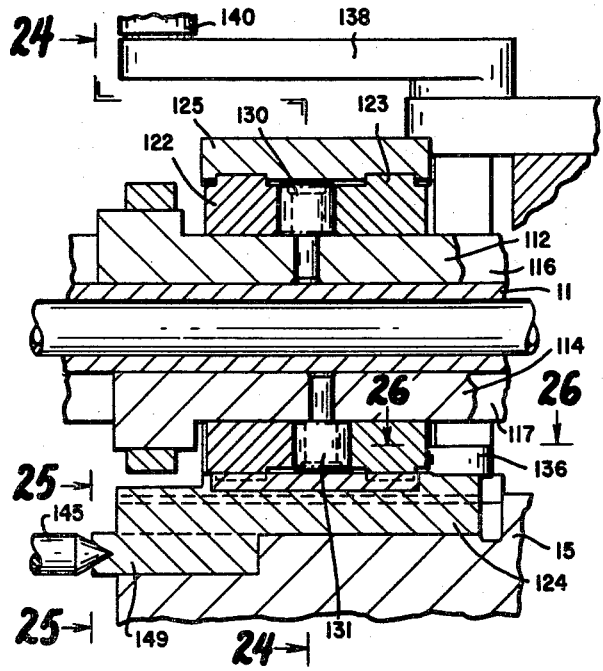
FIG. 23 is an elevational view, partly in section, showing an actuating means for portions of the mechanism shown in FIG. 20.
Figure 25:
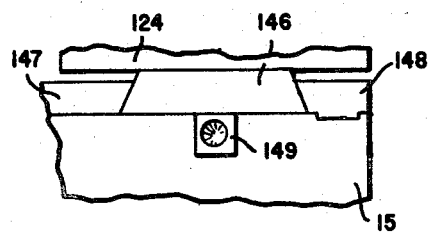
FIG. 25 is a view taken on line 25—25 of FIG. 23.
Figure 24:
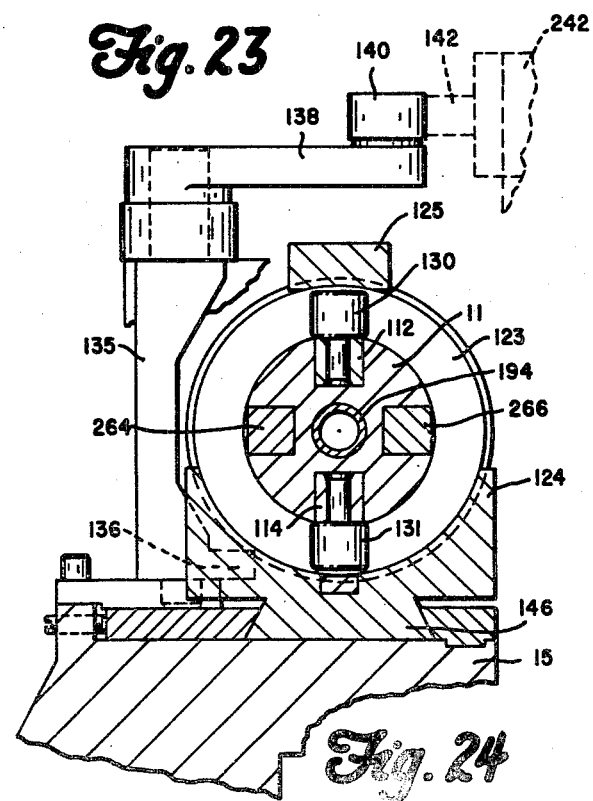
FIG. 24 is a view taken on line 24—24 of FIG. 23.
Figure 26:
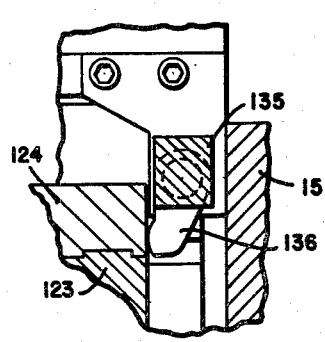
FIG. 26 is a view taken on line 26—26 of FIG. 23.
Figure 27:
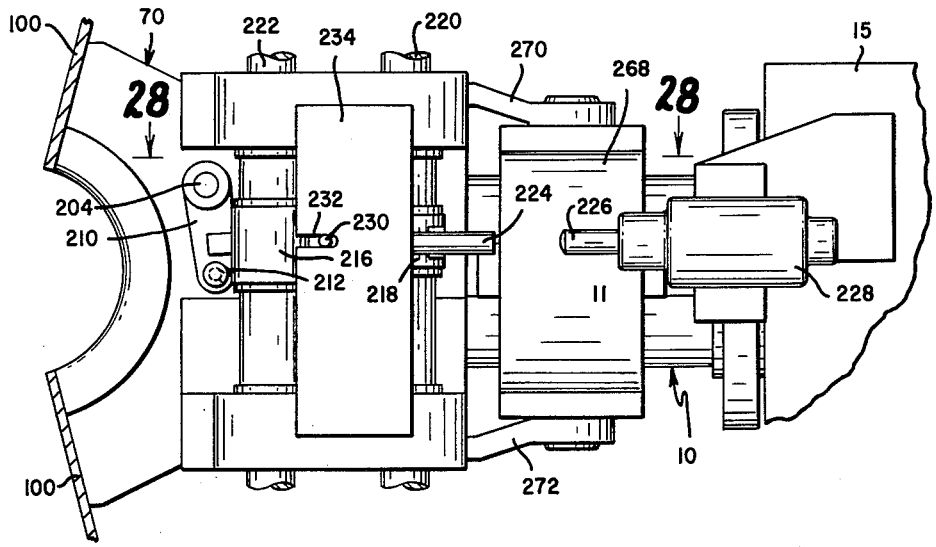
FIG. 27 is an elevational view of a portion of the spindle mechanism showing actuating means for one operation of the mechanism shown in FIGS. 21 and 22.
Figure 28:
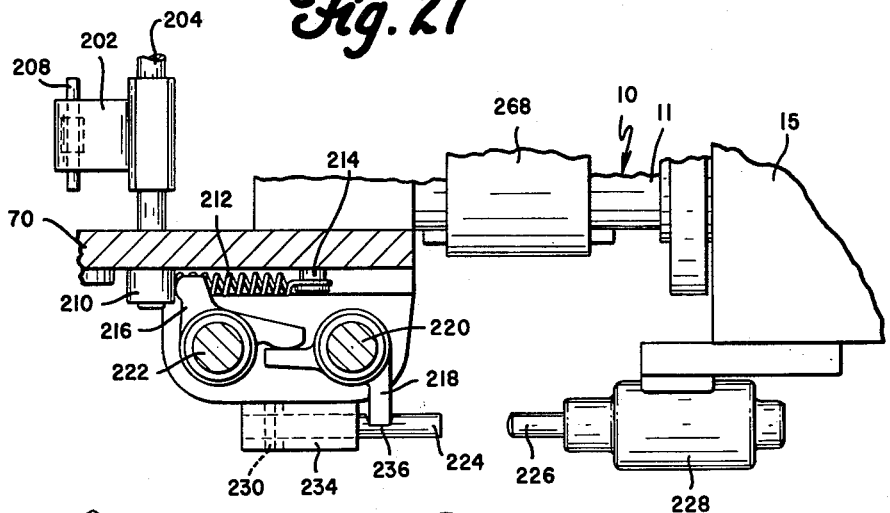
FIG. 28 is a plan view, partly in section, taken along line 28—28 of FIG. 27.
Figure 29:
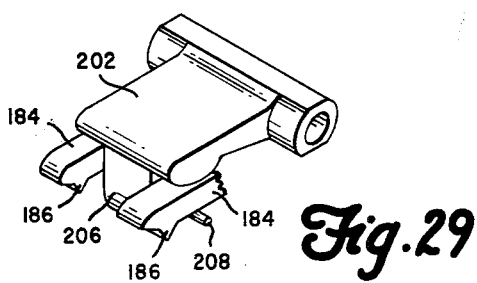
FIG. 29 is an isometric view of an armature indexing member shown in FIGS. 21 and 22.
Figure 30:
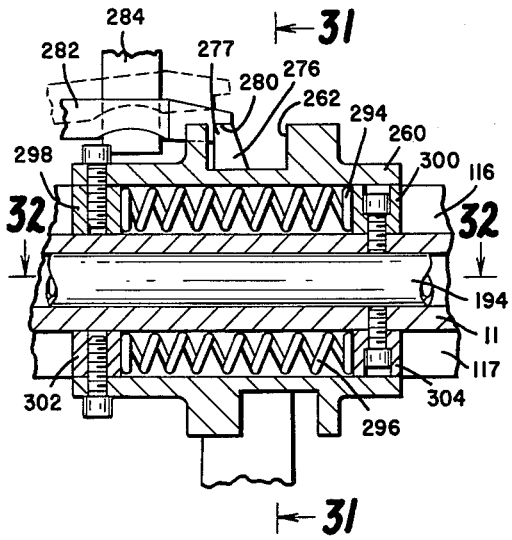
FIG. 30 is an elevational view, partly in section, showing an actuating means for one function of the spindle mechanism.
Figure 31:
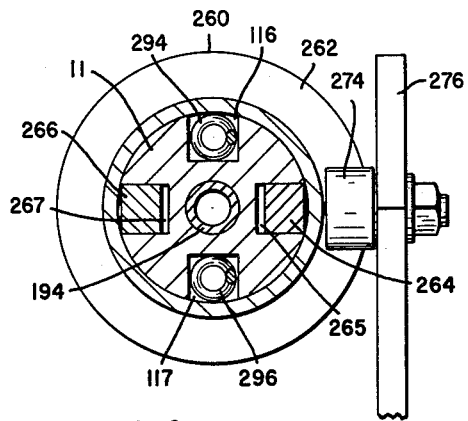
FIG. 31 is a sectional view taken on line 31—31 of FIG. 30.
Figure 32:
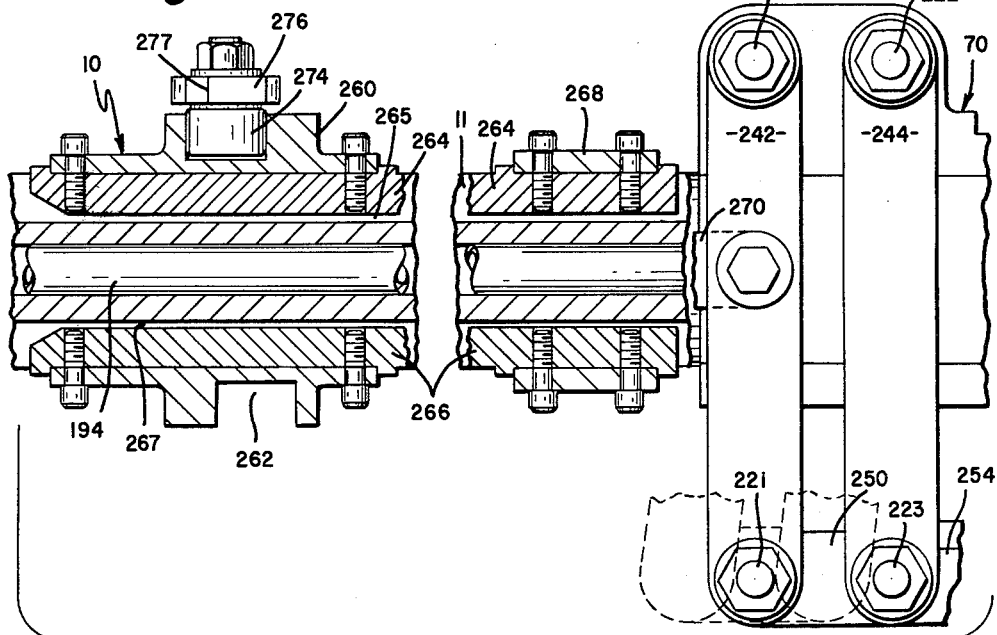
FIG. 32 is a composite plan view, partly in section, and partly taken on line 32—32 of FIG. 30.

An enlarged sectional view of one of the cam mechanisms 120 is shown in FIG. 23. The mechanism includes two spaced collar members 122 and 123 mounted in any suitable manner to a base or sliding block member 124 and held in spaced relation at the top by a bar 125. The space between the two collar members 122 and 123 provides a fixed cam track 128 in which two cam rollers 130 and 131 are rotated. Cam roller 130 is mounted to one end of the sliding bar 112, and the cam roller 131 is mounted to one end of the sliding bar 114. The fixed cam track 128 provides an irregular path for the cam rollers 130 and 131 so that as the shaft 11 is rotated, the cam followers will cause reciprocating bars 112 and 114 to slide a relatively short distance back and forth in grooves 116 and 117, providing the motive means for the tamping fingers. The path of the cam track 128 is designed to control the tamping fingers in a sequential timed relation with the positioning of wires X in the armature core slots C′ (FIG. 20). The sequence is such that as one set of tamping fingers is tamping wires just guided into four slots C′, the other set of tamping fingers is being retracted from the opposite core slots C′, clearing the way for additional wires to be guided into the slots as the spindle and armature rotate. The view in FIG. 20 represents the idle or loading position of the spindle mechanism and related parts as well as an interim position of the parts during rotation.

Normally one set of tamping fingers remains in two core slots of the armature when the spindle and armature are stationary. A means is provided to pull these tamping fingers back far enough to clear the armature core for indexing in a clockwise direction (as viewed in the drawing) preparatory for another winding cycle, or for removing and replacing the armature following a complete winding operation. This is accomplished by moving the block 124 (FIG. 23) longitudinally to the left so that the entire cam mechanism mounted thereon will move the bars 112 and 114 to the left causing all the tamping fingers, particularly fingers 104, to be pulled back clearing the armature.

To move block 124 (FIGS. 23, 24, 25 and 26) to the left, a member 135, pivotally mounted to the bearing block 15, is provided which has an integral offset arm 136 on the bottom and a crank arm 138 mounted on top. Crank arm 138 is provided with a cam follower 140 which cooperates with the edge of a cam plate 142, (FIG. 5) mounted to one of the lead inserting and cutoff assemblies L. When the lead inserting and cutoff assembly L is moved into operating position, which occurs only when the spindle is stationary, plate 142 is moved toward the center of the machine causing follower 140 and crank arm 138 to rotate member 135 in a clockwise direction. Rotation of the member 135 causes integral arm 136 to bear against block 124 forcing the block to the left against the action of a spring 144 (FIG. 13) by means of a spring guide pin 145. Spring 144 is mounted on, and bears against, a wall of gear box 13 of gear assembly 12.

When cam plate 142 is moved in the opposite direction, allowing crank arm 138 to be rotated in a counter-clockwise direction, the compressed spring 144 will force block 124 back to its original position. A slide means is provided on the bottom of block 124 in the form of an inverted key-stone portion 146 which cooperates with guide plates 147 and 148 mounted on the bearing block 15. A depending portion 149 is also provided on block 124 which cooperates with a conical end of pin 145 to insure alignment between spring 144 and block 124.

A camming mechanism similar in construction is also provided on spindle assembly 10′ to operate tamping fingers 102′ and 104′. The corresponding parts have corresponding prime numbers and their functions are the same, therefore, the mechanism will not be described in detail. However, the actual operation of the cam mechanism on spindle 10′ is reversed from that on spindle 10. This is because tamping fingers 102′ and 104′ operate in an opposite direction from fingers 102 and 104 (FIG. 20). With this arrangement, all of the tamping fingers operate in a direction toward the center of the armature in line with the core slots C′.

Referring now to FIGS. 14, 15, and 20, a means 152 is provided in spindle 10′ to guide an armature A between the holding fixtures 70 and 70′, and consists of a member projecting into the fixture opening to cooperate with armature core slots C′ to guide and hold the armature in a predetermined rotary position. Projecting member 152 is an integral part of a member 154 removably connected to the inner end of a sliding tubular shaft 156 positioned in a central bore through shaft 11′. The outer end of the tubular shaft 156 is provided with an actuating collar 158 which cooperates with a bifurcated lever 160, mounted to a shaft 162, to provide the actuating means to move guide member 152 in and out of the fixture opening. Lever 160 and shaft 162 are rotated in an oscillating fashion by the main cam shaft M providing a means for actuating the collar 158. Member 154 is removable so that if the integral projection 152 is broken, the guide member may easily be replaced by actuating a ball clutch holding mechanism 153.

The actuation of the guide mechanism 152 is in timed relation with an armature indexing mechanism also operated by the main cam shaft M. Every time the armature is indexed, the guide member 152 must be retracted to allow rotation of the armature. Immediately after the armature is rotated by the indexing mechanism, the guide mechanism is actuated to thrust member 152 into a core slot C′ to prevent the armature from rotating during the next winding cycle. After an armature is completely wound, the guide member 152 will remain in the projected position to guide a new armature into the fixture opening.

With reference to the indexing movement of an armature in the holding fixture, or for removal from the machine, a means is provided at the left end of spindle assembly 10 (FIGS. 12 and 13) to move the left half of the spindle assembly to the left a relatively short distance, providing a slightly larger opening between fixtures 70 and 70′. At the left end of spindle 10 an actuating collar 170 is provided which cooperates with a vertical bifurcated arm 172, pivoted at its bottom on pin 174, to provide the actuating means to move the spindle assembly to the left. Actuation of the bifurcated arm 172 is provided by the main cam shaft M through a vertical push rod 176 and a conventional double-link toggle expansion mechanism 178. When the push rod 176 is pushed up contacting a lever arm of the double link mechanism, it causes the links to straighten or assume a horizontal position. Since one of the links is pivotally connected to the stationary gear box 13 and the other link is pivotally connected to the pivoted bifurcated arm 172, the arm will be moved in a counter-clockwise direction. The action of the arm 172 on the collar 170 moves the spindle assembly 10 to the left. When push rod 176 is retracted releasing pressure on the expansion link mechanism, the spindle assembly will return to its operating position. The sleeve bearing assembly 48 (FIG. 11) described hereinbefore is provided to allow this movement of the spindle and includes springs 56 which return the spindle assembly to its original position. A horizontal sleeve bearing 180 (FIG. 13) is also provided in bearing block 15 for the longitudinal movement of the spindle assembly 10. This movement of the spindle is necessary to provide sufficient clearance in the central holding fixture when the armature is indexed between winding cycles, and when an armature is loading or unloading from the machine.

An indexing mechanism to change the winding position of the armature is also mounted on, and a part of the spindle assembly 10 as shown in FIGS. 12, 13, 20, 21, 22, 27, 28 and 29. An indexing member 182 is provided mounted behind the guide wings 100 having a hub 183, two integral projecting fingers 184, and two downwardly-projecting integral driving teeth 186, which cooperate with the armature core slots C′ to rotate the armature around in a clockwise direction at the end of each winding cycle to position four empty core slots C′ in alignment with the wire guide wings for the next winding cycle. The hub 183 of member 182 is pivotally mounted on a movable pivot 188 provided at one end of a control link 190, the opposite end of link 190 being pivoted on a fixed pin 167 to control the radial location of pivot 188 during the operation of the indexing mechanism. An interconnecting link 192 is provided pivoted to pin 188 and also to the inner end of a tubular shaft 194 which transmits motion to member 182 by a sliding movement of tubular shaft 194. Shaft 194 is positioned in a central longitudinal bore 196 through shaft 11 of spindle assembly 10. The outer end of shaft 194 is provided with an actuating collar 198 which cooperates with a bifurcated arm 200 pivoted on fixed pin 201. The motive means for the indexing fingers 184 is transmitted from the main cam shaft M to arm 200, tubular shaft 194, interconnecting link 192 to member 182.

A means is provided to guide the fingers 184 during their indexing operation which also functions to raise the fingers out of the fixture central opening at the end of a complete winding operation to prevent interference so that the finished armature may be removed from the machine and replaced with a new one. An arm 202 is provided which bears against the top of the fingers 184 which is affixed to a rotating pin 204 which is pivotally mounted in the side walls of the fixture 70. Arm 202 has a lower integral projection 206, provided with a transverse pin 208, which underlies the finger 184 for the purpose of raising it. The pivot pin 204 mounted in the fixture walls projects through the wall and has a crank arm 210 mounted thereon. The crank arm 210 is spring urged in a counter-clockwise direction (FIGS. 27 and 28) by a coiled spring 212 anchored at one end to a relatively fixed pin 214, also mounted in the same fixture wall. A pair of bell cranks 216 and 218 are provided, rotatively mounted on shafts 222 and 220, respectively, which cooperate with each other to transmit motion from a horizontally-mounted notched sliding pin 224 to arm 210 against the action of spring 212. Pin 224 is actuated by the piston rod 226 of a conventional air cylinder 228 affixed on stationary bearing block 15 when the spindle is in loading position which aligns the members. One end of pin 224 is provided with a small transverse pin 230 which is guided in a slot 232 provided in a mounting block 234 which limits the longitudinally motion of pin 224 to the right (as viewed in FIGS. 27 and 28). Longitudinal motion of pin 224 to the right is a result of the pulling force of spring 212 transmitted through arm 210 to arms 216 and 218 to a slot 236 in pin 224.

When the indexing fingers 184 are to be raised out of the central spindle opening out of the path of an armature being loaded or unloaded, cylinder 228 will be actuated causing the end of piston rod 226 to strike the end of the aligned pin 224, pushing it to the left. The motion is transmitted through arms 218, 216, 210 to arm 202 causing the arm to rotate in a counter-clockwise direction (FIGS. 20, 21 and 22). The transverse pin 208 of arm 202 being positioned under the indexing fingers 184 will raise the indexing fingers high enough to clear the armature holding surface of the fixture 70, as shown in FIG. 22. The indexing fingers will remain in that position while a finished armature is being removed and another armature is loaded into the machine. As soon as an armature is loaded into the machine, cylinder 228 will be actuated in the opposite direction, allowing spring 212, through arm 210, pin 204, and arm 202, to lower the indexing fingers by means of arm 202 bearing against the top of the fingers. The force of spring 212 also causes the integral teeth 186 of fingers 184 to constantly bear against the outer annular surface of the armature insuring meshing of the teeth 186 with core slots C′ during an indexing operation.

Another mechanism included in the spindle assemblies 10 and 10′ is a means to oscillate a parallel bar assembly which moves an inner member R of a wire capture mechanism, in and out of an operating position, parallel with the sides of the armature commutator B. The details and operation of the wire capture mechanism will be described further hereinafter. The parallel bar mechanisms and their functions are similar on both spindle assemblies 10 and 10′, except for the direction of operation. Therefore, the mechanism on spindle assembly 10, only, is shown and described (FIGS. 12, 13, 30, 31 and 32).

Figure 42:
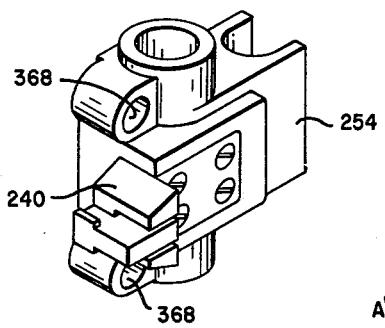
FIG. 42 is an isometric view showing a mounting means for a portion of a wire capture mechanism.

In the drawings, two parallel bars 242 and 244 are shown located on the top side of fixture 70 when the spindle is stationary for loading. Two similar bars 246 and 248 (FIG. 13) are provided on the opposite side, or bottom, of fixture 70 all being pivotally mounted on the opposite ends of studs 220 and 222. The ends of bars 242 and 244 are pivotally inter-connected with a link 250 mounted on studs 221 and 223. Bars 246 and 248 are similarly connected at their ends with a link 252 and the opposite ends of the same studs 221 and 223. An alignment block 254, better seen in FIG. 42, is also positioned on studs 221 and 223 to which is mounted an inner member 240 of the wire capture mechanism. The alignment block 254 serves another purpose that will be explained hereinafter.

Figure 38:
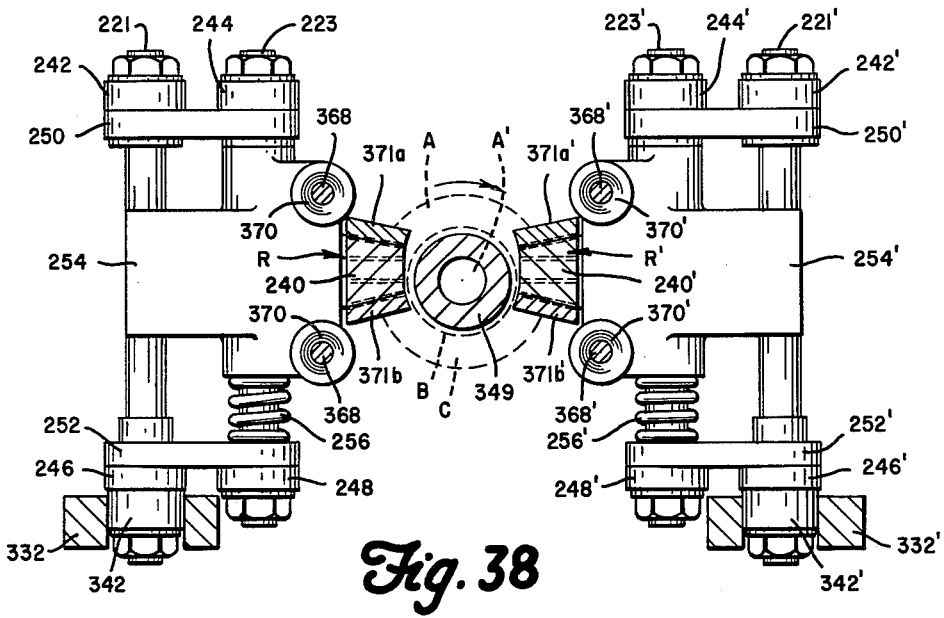
FIG. 38 is an elevational view, partly in section, taken along line 38—38 of FIG. 34.

It can be seen in the drawings that the parallel movement of bars 242, 244, 246 and 248 will move and maintain block 254 in a position parallel with the spindle shaft 11. This parallel movement will position member 240 so that the front face of the member will be adjacent to the annular outer surface of the commutator and parallel with the commutator bars (FIG. 38).

Means to move the parallel bars 242, 244 and 248 about their stationary pivots is partially provided by a cam track 262 formed in a floating cam member 260, resiliently mounted on the spindle shaft 11, (FIG. 12) adjacent the main bearing support 13. A cam follower 274 (FIG. 32) is positioned in the cam track 262 to follow it and is mounted to a vertical oscillating arm 276 pivoted at its lower end on fixed pin 278 (FIG. 13) on the bearing support 15. As cam member 260 is rotated with shaft 11, the irregular path of cam track 262 will, through the cam follower 274, cause arm 276 to move back and forth about its pivot pin 278. When the arm 276 is restricted from moving in a counter-clockwise direction about its pivot pin 278, continued rotation of shaft 11 will cause the floating cam member 260 to move to the right through the camming action of cam track 262 and cam follower 274. Means to restrict the movement of arm 276 is provided by a pivoted arm 282 (FIG. 30) which has a notch 280 on its end to engage the upper tip 277 of arm 276. When arm 276 is to oscillate freely, a solenoid 286 is actuated to raise a dependent arm 284, which engages the bottom edge of arm 282, to raise it, disengaging notch 280 from tip 277 of arm 276. Actuation of solenoid 286 is timed so that arm 276 is free to oscillate while coils of wire are being wound on the armature. After the coils have been wound, and as the shaft 11 rotates through the last revolution, solenoid 286 will be deenergized, dropping the arm 282 into the path of arm 276, restricting the counter-clockwise travel of arm 276 and its cam follower 274, causing the floating cam member 260 to move to the right against a resilient bias.

When cam member 260 moves to the right, the motion is transmitted to two longitudinal bars 264 and 266 (FIGS. 13, 31 and 32) located in longitudinal grooves 265 and 267 in the shaft 11. One end of each of the longitudinal bars is connected to the floating cam member 260 and their opposite ends are connected to a sliding collar 268.

The sliding collar transmits motion to two oppositely disposed links 270 and 272 pivotally connected to the collar and to two parallel bars 242 and 246, transmitting motion to the parallel bar assembly. This motion will move the bar assembly toward the center of the machine into an operating position.

To return the parallel bar assembly to the left, to an inoperative position, two coil springs 294 and 296 are provided (FIGS. 30 and 31) located in grooves 116 and 117 in the shaft 11. One spring 294 is compressed between blocks 298 and 300, and the other spring 296 is compressed between blocks 302 and 304. Blocks 298 and 302 are mounted to the floating cam member 260, and blocks 300 and 304 are affixed to the spindle shaft 11. The springs, being compressed between the blocks, will force the floating cam member to the left as soon as the solenoid 286 lifts arm 282 out of the path of arm 276. The motion will be transmitted through bars 264 and 266, collar 268, and links 270 and 272, to the parallel bar assembly. The constant pressure of the springs 294 and 296 bearing against blocks 298 and 302 will maintain the parallel bar assembly in an inoperative position out of the path of wires X during the winding operation. Similar parts are provided on spindle 10' to perform a similar function, except in the opposite direction, and are identified with corresponding prime numbers.

*Slot selector and spindle alignment mechanism*

The slot selector and spindle alignment mechanism W comprises several assemblies which performs several different functions. One of the functions is to select four commutator slots B' into which four leading ends of the continuous wire strands are inserted at the beginning and the coil trailing leads are inserted at the end of each winding cycle. Another function is to capture and hold the ends of the four wires X while a wire cutoff and coil lead inserting operation is performed. Still another function is to engage and hold the two spindle parallel bar assemblies in perfect alignment with the wire capture and guide mechanism to insure the coil leads being inserted into the commutator bar slots B'. Two other functions are to eject the waste portions of wire as a result of the cutoff operation, and to eject the finished armature following a complete winding operation.

Figure 33:
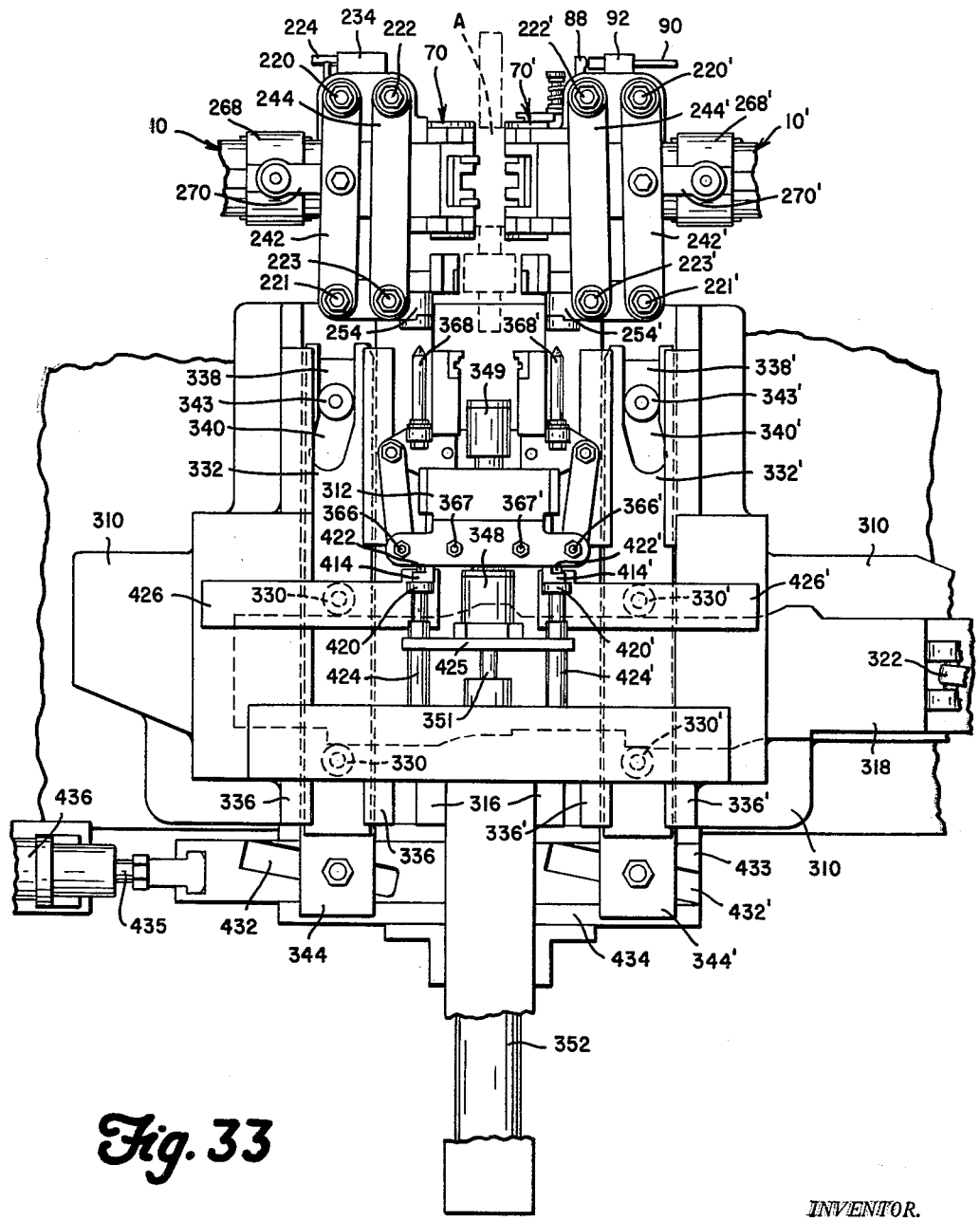
FIG. 33 is a top plan view of a portion of the machine showing means for positioning various elements during the operation of the machine.

The major portion of the mechanism is moved in and out of operating position by a slide mechanism operated by the main cam shaft M. FIG. 5 shows the mechanism in its forward operating position and FIG. 33 is an enlarged view showing the mechanism in its retracted inoperative position. A large casting 310 is provided upon which the main slide mechanism 312 is mounted on the top surface of the machine frame F and provides a means of holding various parts in relative operating positions.

Figure 36:
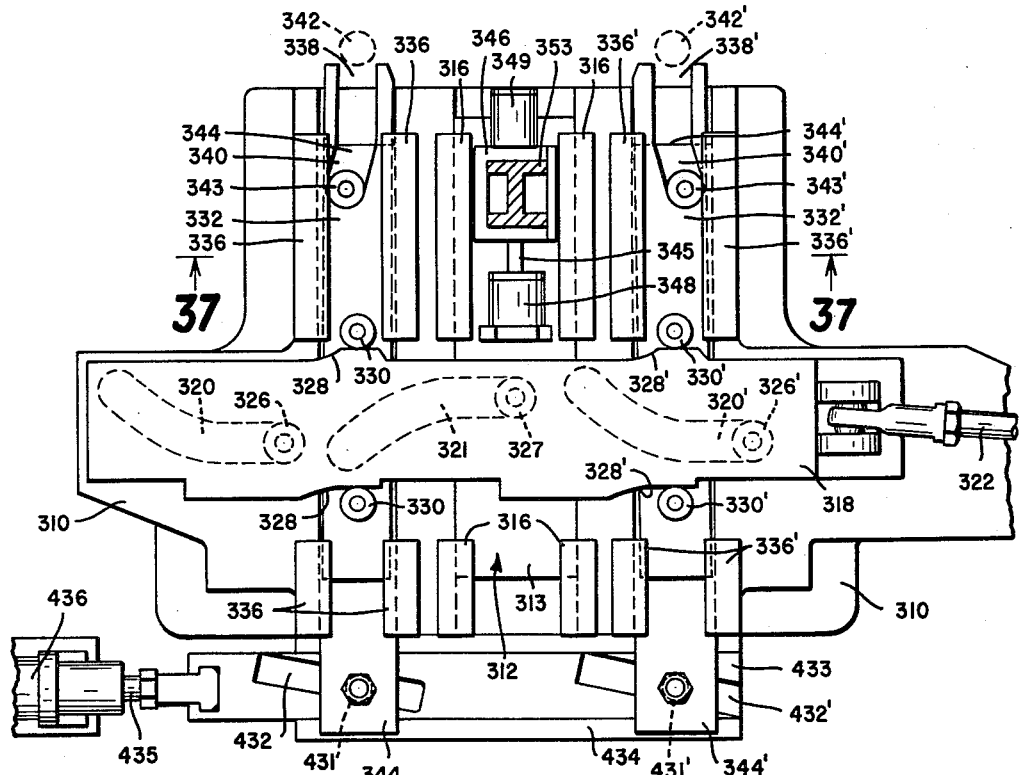
FIG. 36 is a plan view similar to FIG. 33 with various elements removed for clarity.
Figure 37:
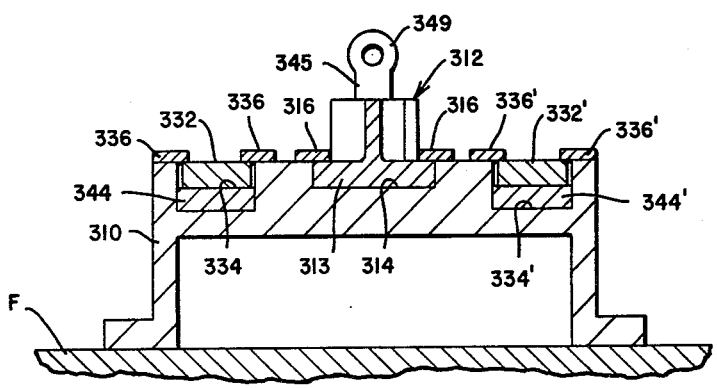
FIG. 37 is a sectional elevation taken on line 37—37 of FIG. 36.

The main slide mechanism 312 is positioned in a track, or groove 314 (FIG. 37) provided in the top surface of the casting 310 and slides back and forth in a line parallel with the armature shaft. The mechanism 312 is held in the track 314 with a pair of bars 316 suitably mounted to the member 310 and is actuated in its back and forth movement by a transverse sliding cam plate 318 (FIG. 36). The plate 318 is provided with three indented camming slots 320, 320', and 321 in its bottom surface, and a driving connecting rod 322 pivotally connected at its right end, which in turn is pivotally connected at its opposite end (FIGS. 5, 6 and 7) to an oscillating arm 324 pivotally mounted to the machine frame F and adapted to be actuated by the main cam shaft M. Two cam followers 326 and 326' are mounted to the casting 310 in stationary locations and cooperate with the cam slots 320 and 320' to move the cam plate 318 in an oblique direction when the connecting rod 322 is actuated by the arm 324 to pull or push the cam plate 318. A similar cam follower 327 is mounted to the top of the base member 313 of the main slide mechanism 312 and cooperates with the central cam slot 321 of the cam plate 318 to move the mechanism 312 in and out of operating position. As shown in FIG. 36, the cam slots 320 and 320' are provided with curved paths running in an opposite direction from the path of slot 321. This provides a means of increasing the distance which the main slide mechanism 312 travels allowing the cam plate 318 to operate in a minimum area on the casting 310.

The longitudinal edges of the cam plate 318 are provided with camming portions 328 and 328' (FIG. 36) which cooperate with the cam followers 330 and 330' mounted on two sliding alignment bars 332 and 332', respectively, to move the bars in and out of their operating positions simultaneously with the movement of the main slide mechanism 312. The alignment bars are loosely positioned in tracks 334 and 334' (FIG. 37) for slight lateral movement provided in the casting 310 and rest on top of and are partially controlled by two other sliding bars 334 and 344' which fit snugly in the tracks 334 and 334'. All of the bars are held in the tracks, in a sliding relation, with two sets of retaining bars 336 and 336' (FIG. 36) suitably mounted to the casting 310. The inner end of each of the upper alignment bars is provided with an open guide slot 338 and 338', each terminating in oblique portion 340 and 340'. The open ends of these guide slots 338 and 338' engage two rollers 342 and 342' (FIG. 38) mounted on the bottom of studs 221 and 221' of the spindle parallel bar assemblies for moving these assemblies inwardly. The oblique portions 340 and 340' of the guide slots cooperate with rollers 343 and 343' mounted on the lower sliding bars 344 and 344', to move the alignment bars toward each other when they are in their extreme forward position, so that the parallel bar assemblies are moved thereby.

When the alignment bar 332 and 332' are actuated by the member 318, they will move forward a short distance to engage the rollers 342 and 342' of the parallel bar assemblies. Continued forward or inward movement of the bars will cause the oblique portions 340 and 340' to cam off of the rollers 343 and 343' to force the upper alignment bars and the parallel bar assemblies in toward each other. This action positions the wire capture mechanism, provided with wire guide slots to be described in detail hereinafter, as close as possible to the outer annular surface of the commutator B. The arrangement as described insures insertion of the coil leads into the commutator bar slots B' during the lead inserting operation. Further operation of the alignment bars to control the members cooperating with the wire and the commutator will be explained in connection with the removal and replacement of armatures.

Figure 34:
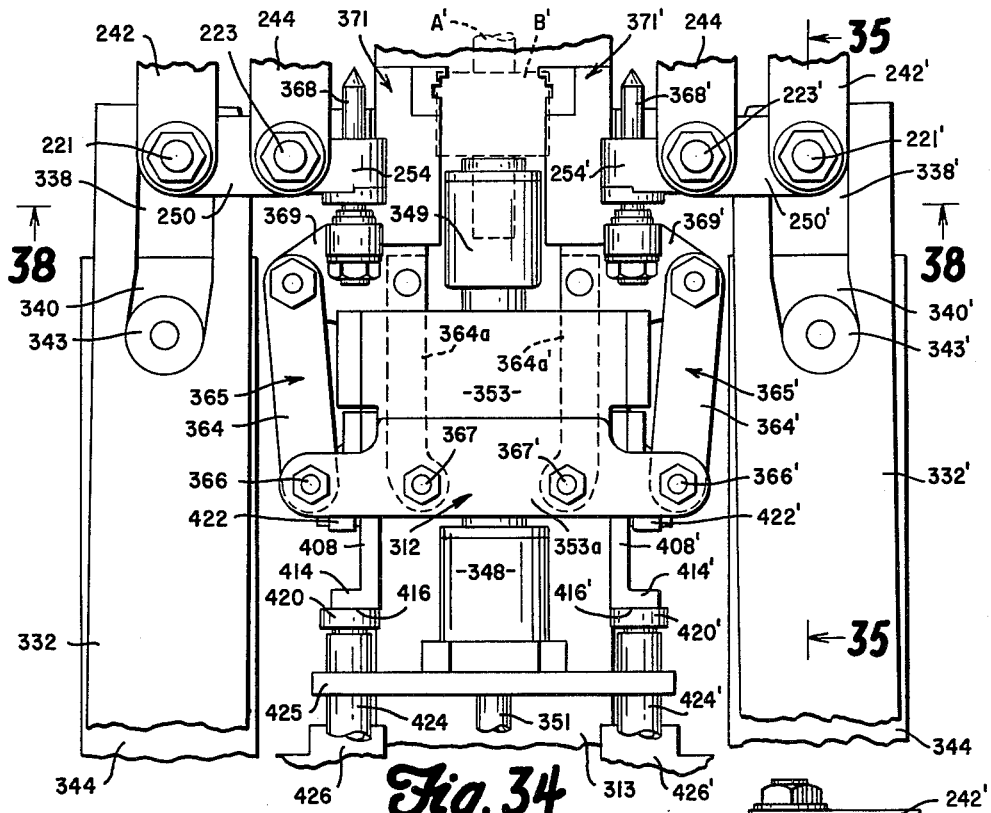
FIG. 34 is an enlarged plan view of a portion of the mechanism shown in FIG. 33.
Figure 35:
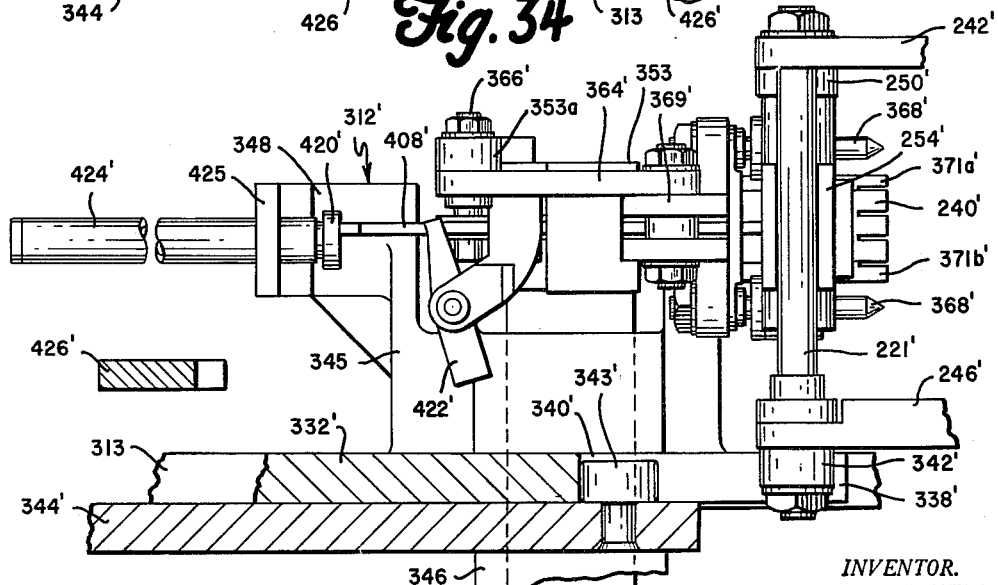
FIG. 35 is a view, partly in section, taken along line 35—35 of FIG. 34.

One of the parts included in the main slide mechanism 312 is an upperwardly extending portion 345 of casting 312 provided with two integral guide sleeves 348 and 349 (FIGS. 33, 34 and 35). The sleeve 348 guides a piston rod 351 of an air cylinder 352, and sleeve 349 also guides the same piston rod and also establishes a cooperative alignment between the piston rod and the end of the armature shaft which it encircles at selected times. The air cylinder 352 and its piston rod 351 are provided on the machine to eject a finished armature from its position between the spindle members by striking the end of the armature shaft with a hammer-like blow. When the air cylinder 352 is retracted and inoperative, the end of the piston rod 351 remains partly engaged in the guide sleeve 348. The two guide sleeves insure alignment of the piston rod and the armature shaft during the armature ejection operation.

Another integral element of the casting portion 345 is a depending member 346 (FIG. 35) extending down through an opening 347 in the cast mounting member 310 (FIGS. 35, 39, 40 and 41). The depending portion 346 is provided with a vertical opening in which is guided a vertically-operating member 353. The lower end of the member 353 is provided with a horizontal aperture in which is positioned a sleeve bearing 354 and an actuating pin 355. The sleeve bearing 354 and the pin 355 project through elongated holes 356 provided in the opposite sides of the depending portion 346 of member 345, and act as guides to maintain actuation of the pin 355 in a given vertical plane. The pin 355 provides a means of maintaining the member 346 and 353 in an operating relation when the main slide mechanism 312 is in its forward position. It also provides an actuating means for the vertical operation of member 353.

The opposite ends of the pin 355 are provided with blocks 357 and 357', and are actuated up and down in a vertical plane by being positioned in oblique grooves 358 and 358' provided in two horizontal sliding members 359 and 359', which are guided in tracks provided by assembling track forming bars 361 and 361' to the cast mounting member 310. Actuation of the sliding members is provided, through two connecting rods 362 and 362', suitably connected thereto, and operated by an oscillating arm 363 (FIGS. 5, 6, 8 and 39) pivoted to frame F and operated by the main cam shaft M.

Figure 48:
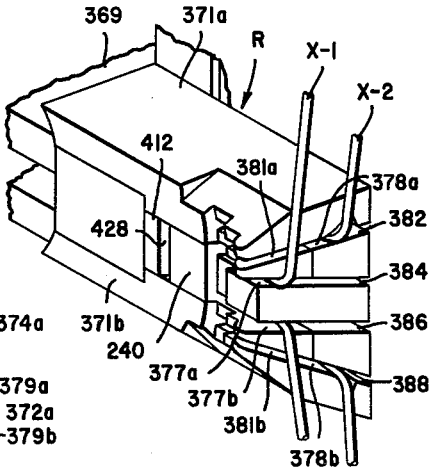
FIG. 48 is a view showing the elements in FIG. 47 in a closed or capturing position.

The upper portion of member 353 has two parallel bar assemblies 365 and 356' comprising bars 364, 364A and 364' and 364A' mounted thereon which are pivoted at relatively stationary pivots 366, 367, and 366' and 367', mounted in spaced relation on a bar 353A (FIG. 34). The parallel bar assemblies are conventional in design and operation and will not be explained in detail. Two horizontal projecting pins 368 are mounted to a head member 369 (FIGS. 43 and 44) of the parallel bar assembly 365, and positioned in spaced relation in a vertical plane. The opposite assembly 365' also has two projecting pins 368' similarly mounted to a member 369' (FIGS. 34 and 38). Both of the members 369 and 369', being part of the parallel bar assemblies 365 and 365', are actuated in a horizontal plane, maintaining their projecting pins in planes parallel with the armature shaft. Also mounted on each of the parallel actuated head members 369 and 369' is a set of outer wire capture members 371 and 371' (FIGS. 35, 43 and 44) which cooperated with an inner set of members 240 and 240', as shown in FIGS. 38 and 48. The outer wire capture members comprise upper and lower preformed bars 371a and 371b on one assembly, and 371a' and 371b' on the other opposite assembly. When the outer wire capture members are in assembled relation with the inner wire capture members 240 and 240' (FIG. 38), they constitute two wire capture mechanisms R and R', to be described hereinafter.

The two sets of projecting aligning pins 368 and 368' are provided to engage two sets of holes 370 and 370' in the blocks 254 and 254', already described (FIG. 38), providing a means of locking the spindle parallel bar assemblies and the main slide parallel bar assemblies together as an assembled unit. Conical heads are provided on the pins while a countersink is provided for the outer surface of the holes to facilitate engagement when moved relative to each other during engagement. The assembled unit provides a method of actuating the two wire capture mechanisms in both horizontal and vertical planes during the inserting operation.

Assuming that the spindle S has stopped rotating, and its parallel bar assemblies have been moved in toward the commutator to a predetermined position by the cam members 260 and 260', the main slide mechanism W will be moved forward so that the pins 368 and 368' will engage the holes 370 and 370' in the blocks 254 and 254'. As the pins are engaging the blocks, the alignment bars 332 and 332' are also being moved forward to engage the rollers 342 and 342' (FIG. 38). The main slide mechanism will move forward until the pins are fully engaged and the inner and outer wire capture members are in engaged relation. After the mainslide mechanism stops, the alignment bars 332 and 332' will continue to move forward so that the diagonal slots 340 and 340' (FIG. 6), cooperating with the rollers 343 and 343', will cause all four of the parallel bar assemblies to be actuated moving the two engaged wire capture mechanisms a short distance together closer to the commutator in predetermined horizontal and vertical planes.

The parallel bar assemblies 365 and 365' and the blocks 254 and 254' being locked together to move as a unit by the projecting pins 368 and 368', also provides a means of moving the engaged wire capture mechanisms vertically in their respective vertical planes. The vertical movement is provided by the oscillating arm 363 (FIG. 39) when it is actuated by the main cam shaft M. The action is transmitted through the connecting rods 362 and 362', and their related slide members, to the vertically movable member 353 (FIGS. 35, 40 and 41) so as to move the parallel bar assemblies 365 and 365' either up or down as required.

Vertical movement of the engaged wire capture mechanisms is necessary in order to select the correct slots of four different commutator slots each time a coil lead inserting operation takes place. The engaged mechanism is used in its "down" position for the beginning of a winding cycle and in its "up" position to end a winding cycle, the reasons for which will be better understood on perusal of a detailed explanation hereinafter of the wire capture mechanism. Since the winding cycles end with the parallel bar assemblies 365 and 365' in an "up" position, the springs 256 and 256' (FIG. 38) are provided on the studs 223 and 223' to maintain the blocks 254 and 254' in and "up" position when the pins 368 and 368' are disengaged from the blocks, thus insuring vertical alignment of the engaging pins and their respective holes for another coil lead inserting operation.

*Wire capture mechanism*

The two wire capture mechanisms R and R' (FIGS. 34 and 38) each comprise three main components, an inner member 240, a top outer member 371a, and a bottom outer member 371b. The mechanisms, when in assembled relation, provide a means of holding the wires X in a given position during a wire cut-off and coil lead inserting operation. In addition to holding the wires, the physical characteristics of the mechanisms is such that means are provided to cooperate with a moving blade member to shear the wires. Also, guide slots are provided in the assembled mechanisms to guide the coil leads as they are being pushed into the commutator slots B' by the shear blade. Mechanisms for actuating the shear blade will be described hereinafter in connection with the lead inserting and cutoff mechanisms L and L'. Except for the direction of operation, the functional characteristics of the two mechanisms R and R' are the same, therefore the operation of only one, mechanism R, will be described.

Figure 45:
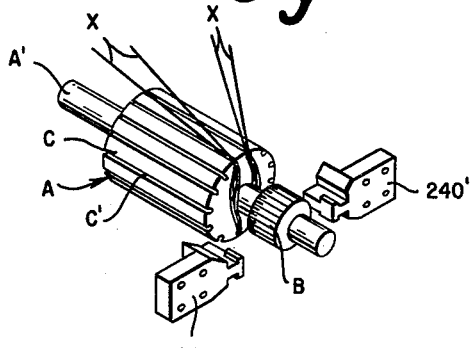
FIG. 45 is a schematic isometric view showing a function of one of the elements of the machine.
Figure 46:
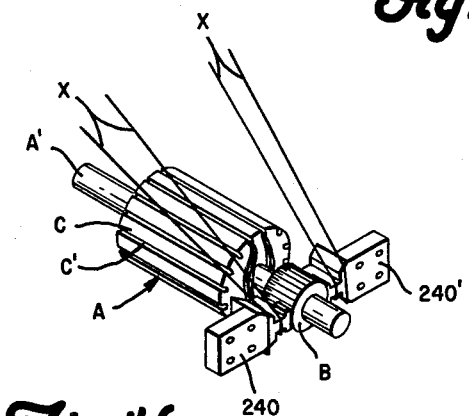
FIG. 46 is a view similar to FIG. 45 showing the same element in a different operating position.

FIGS. 45 and 46 show the initial operation of the wire capture mechanism by the inner member 240 catching two continuous wires after a given number of turns have been wound on the armature core. FIGS. 47 through 54, inclusive, show the operation of the wire capture mechanism R as viewed from the armature loading and unloading side of the machine.

As the armature is being rotated by the spindle S, the continuous wires X are guided into the core slots C' by the guides 100 (FIGS. 6 and 20). After a given number of turns of wire have been wound, and just before the last revolution of spindle S is completed, the member 240 is moved into the path of the guided wires by the cam mechanism 260 mounted on the spindle assembly 10, described hereinbefore. When the spindle finally stops, the two wires X-1 and X-2 and member 240 will be in the separated positions shown in FIGS. 46 and 47. Due to a conventional wire tension mechanism, not shown, the wires are kept taut and will remain in this position. After the spindle S is stopped, the slide mechanism 312 is actuated moving the outer wire capture members 371a and 371b forward to engage over and cooperate with the inner member 240, capturing the two wires between the inner and outer members with hairpin loops formed in the wires as shown in FIGS. 47 and 48.

The inner member 240 is provided with two outwardly-disposed parallel surfaces 372a and 372b, and two divergent outwardly-disposed inclined surfaces 374a and 374b positioned outwardly of the parallel surfaces. The outer members 371a and 371b are provided with two parallel inwardly-disposed surfaces 373a and 373b, and two inclined inwardly-disposed surfaces 376a and 376b. When the continuous wires are captured, wire X-1 is between the upper cooperating parallel surfaces 372a and 373a, and also the lower cooperating parallel surfaces 372b and 373b with a connecting portion extending over the end face between the parallel surfaces. Wire X-2 is between the upper inclined surfaces 374a and 376a, and also the lower inclined surfaces 374b and 376b also with a connecting portion. These surfaces (FIGS. 47 and 48), when in assembled cooperative relation, form slots 377a, 377b, 378a and 278b, which cooperate with preformed slots 379a, 379b, 381a and 381b in the inner and outer members, respectively, to provide complete aligning guide slots 382, 384, 386 and 388 which also align in pairs with commutator slots for the coil lead inserting operation as will be described further hereinafter.

Figure 47:
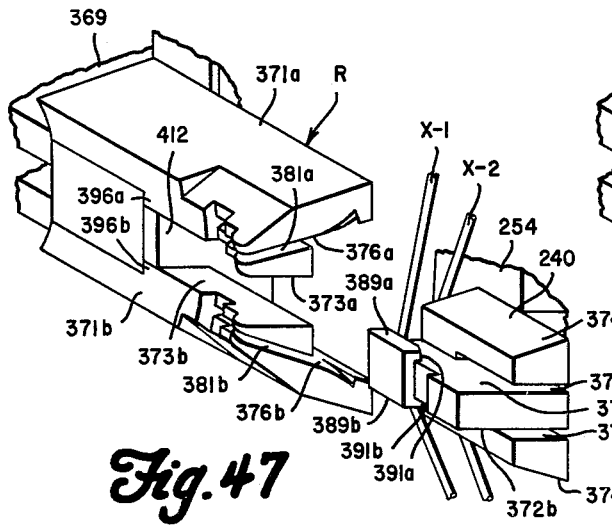
FIG. 47 is an exploded isometric view of the inner and outer wire-capture elements.
Figure 49:
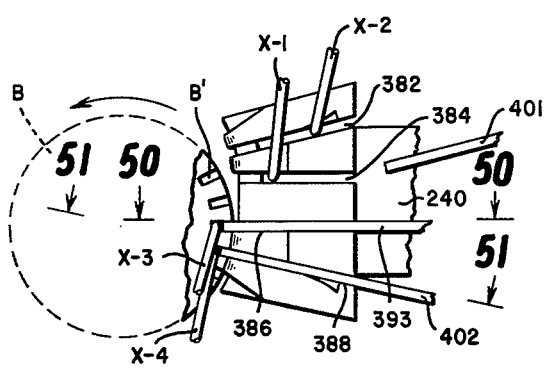
FIG. 49 is a schematic elevation showing a coil lead inserting operation.
Figure 50:
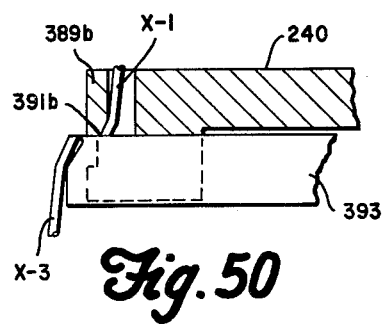
FIG. 50 is a sectional view taken on line 50—50 of FIG. 49.

The inner member 240 is also provided with two integral raised projections 389a and 389b, one on the innermost portion of the upper surface 372a and one similar on lower surface 273b (FIGS. 47 and 50). These projections provide abutments to retain a portion of the wire in the capture mechanism during the wire cutoff process, as shown in FIG. 50. The projections also provide shearing edges 391a and 391b, at the inner corner of each of the projections, which cooperate with a combination shear and lead inserting blade 393 to cut the wire X-1 in the lead inserting operation (FIG. 49).

Figure 51:
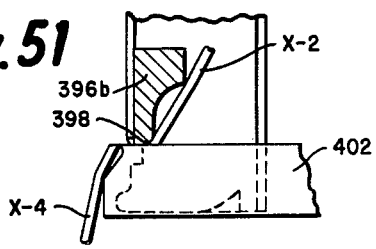
FIG. 51 is a sectional view taken on line 51—51 of FIG. 49.

The outer members 371a and 371b are also provided with wire retaining abutments with shearing edges. The retaining abutment is provided by integral projections 396a and 396b (FIGS. 47, 51, and 54), which also provide the parallel horizontal surfaces 373a and 373b for the guide slots. The shearing edges are provided at a corner 398, as shown in FIG. 51, which cooperate with the blades 401 and 402 (FIG. 49) to cut the wire X-2, in the lead inserting operation.

Figure 52:
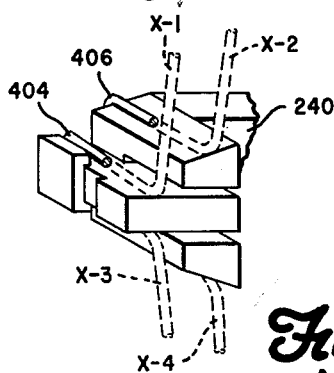
FIG. 52 is an isometric view showing various positions of the wires, partly in phantom, on the inner wire-capture mechanism.

When the continuous wires X-1 and X-2 are captured, the capture mechanism is in its "up" position, as shown in FIG. 49, positioning the two lower guide slots 386 and 388 in line with two commutator slots B', and the inserting blades 393 and 402. The two inserting blades are then actuated to move toward the center of the commutator a predetermined distance. As the inserting blades are guided through the guide slots 386 and 388, the continuous wires are cut to free the already-wound coil, and the cutoff ends which now become trailing coil leads X-3 and X-4, are pushed into respective commutator slots B' to end a winding cycle. After the trailing leads are inserted in the commutator, the blades 393 and 402 are withdrawn from the capture mechanism and the armature is indexed in a counter-clockwise direction, as viewed in FIG. 49 which is a rear view. The capture mechanism, still retaining the ends of the continuous wires X-1 and X-2, is then pulled down (by mechanism described hereinbefore) so that the two upper guide slots 382 and 384 are in line with two commutator slots B' and the inserting blades 401 and 393. It should be noted here that the blade 393 is used in both of the horizontal guide slots since the "up" and "down" movement of the capture mechanism will position one or the other of the horizontal guide slots, 384 or 386, in line with the horizontal blade 393. Blades 401 and 393 are then actuated to cut the continuous strands again to free a small hairpin of waste wire and push the raw ends X-1 and X-2 into two commutator slots to begin another winding cycle. As soon as the leads are inserted in the commutator slots, the blades 401 and 393 are withdrawn from the capture mechanism, and the mechanism is moved up in a vertical plane by the cam shaft M to its original position. FIG. 52 shows the positions occupied by the four leads, with relation to the inner wire capture member 240, and the remaining waste wire portions after the leads have been inserted into the commutator slots.

Assuming that insertion of the leads X-3 and X-4 completed the winding operations of an armature, the capture mechanism will retain the ends of continuous wires X-1 and X-2 while being moved, in a horizontal plane, a short distance away from the commutator for clearance by an operation described hereinafter. The finished armature is then removed and a new one placed in the machine. The capture mechanism is again moved forward to operating position and pulled down, in a vertical plane, so that the two upper guide slots 382 and 384 are in line with two commutator slots B' and the blades 401 and 393. The blades are then actuated to cut off a waste portion and to push the new ends of the continuous wires X-1 and X-2 into the commutator slots, after which they are withdrawn from the capture mechanism, with the capture mechanism moving up to its original position to begin the new winding cycle.

In the case of a new armature, the insertion of the ends X-1 and X-2 is the beginning of an armature winding operation. In the case of a partially-wound armature, the insertion of ends X-1 and X-2 is the beginning of a single winding cycle. In either case, the insertion of leads X-3 and X-4 is always the end of a winding cycle. Also, the capture mechanism is always moved to a "down" position to insert the ends X-1 and X-2 to begin a winding cycle, and in an "up" position to insert the leads X-3 and X-4 after the coils are wound.

After the cutting, the coil lead inserting operation in the commutator slot is completed, two waste portions of wire 404 and 406, having hairpin configurations (FIGS. 52 and 53), are retained in the wire capture mechanism. When the capture mechanism is moved away from the commutator, and the outer members 371a and 371b are withdrawn from the inner member 240, the waste portions of wire 404 and 406 tend to remain wedged between the two outer members 371a and 371b. This is due to a natural spring-back of the free ends of the waste wire portions after the cutting operation. A means is provided to eject these waste portions from the outer wire capture members when the slide mechanism 312 is pulled back to inoperative position and the inner and outer capture members are disassembled.

Figure 53:
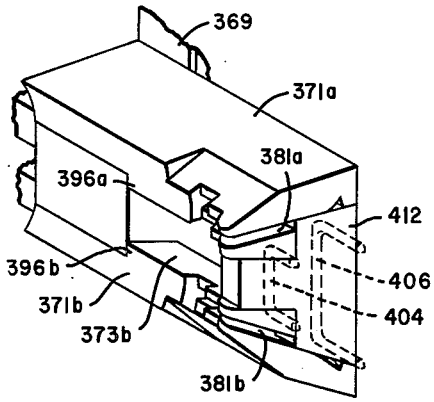
FIG. 53 is an isometric view showing the ejection of the waste portions of wire.
Figure 54:
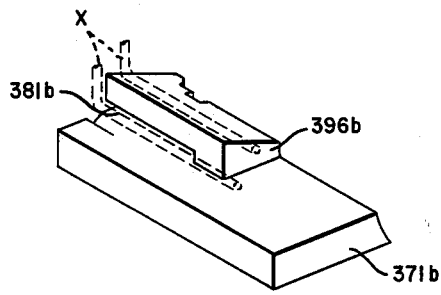
FIG. 54 is an isometric view showing the positions of the wires, in phantom, on the outer wire capture member.
Figure 44:
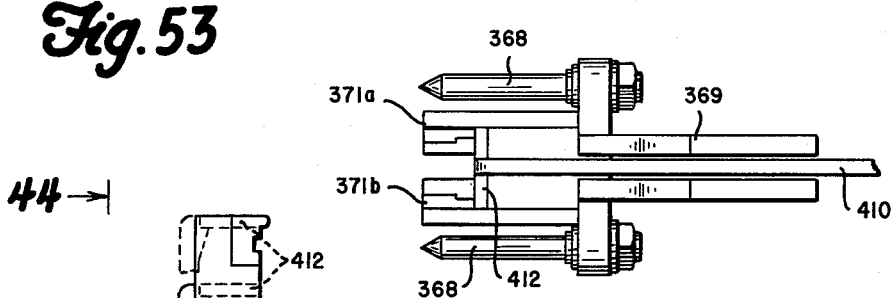
FIG. 44 is an elevational view taken on line 44—44 of FIG. 43.
Figure 43:
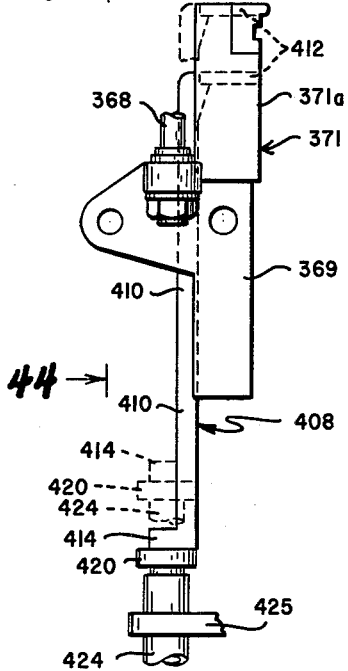
FIG. 43 is a plan view of details shown in FIG. 33 positioned here in different operating positions.
Figure 55:
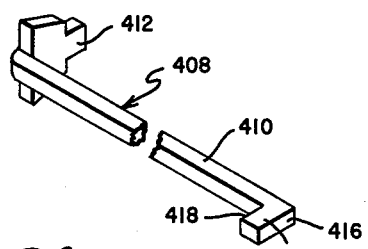
FIG. 55 is an isometric view of one of the waste wire ejection members.

Two ejection members 408 and 408' (FIGS. 33, 34, 35, 43, 53 and 55) are provided on the slide mechanism 312, mounted to slide along the outer surfaces of the members 369 and 369' of the parallel bar assemblies 365 and 365'. One of the ejection members, 408, is shown in FIGS. 43, 44 and 55, having a shaft portion 410, an ejection end 412, and an actuating end 414. The ejection end 412 is preformed to slide between the outer wire capture members, as shown in FIG. 53, and ejects the waste portions of wire from the outer wire capture members. The opposite actuating end 414 is provided with two surfaces 416 and 418 on a transverse lug which cooperate with two different actuating means to operate the whole device in opposite directions, whereby the ejection member is moved with relation to the movement of the slide mechanism 312 to clear the waste wire portions from the machine. The ejection member 408' is identical to member 408, but is positioned on the slide mechanism 312 in an inverted position, as shown in FIGS. 33 and 34.

The actuating means to move the ejection member 408, 408' are shown in FIGS. 33, 34 and 35 comprising two spring urged plungers 420 and 420', and two pivoted actuating fingers 422 and 422'. The spring actuated plungers 420 and 420' (and coil springs not shown) are housed in tubes 424 and 424' mounted to a cross bar 425. The cross bar 425 is affixed to the guide cylinder 348 of the slide mechanism 312 so that the plunger assemblies will move with the slide mechanism. The heads of the spring urged plunger bear against the surfaces 416 and 416' of the ejection members constantly, urging them in a forward direction toward the spindle S.

After the coil leads have been inserted in the commutator slots, the slide mechanism 312 is pulled back to clear the area near the rotating spindle mechanism for the winding operation. The rearward movement of the slide mechanism also causes ejection of the waste portions of wire from the outer wire capture members. As the slide mechanism 312 is being pulled back, the spring-urged plungers push the ejection members 408 and 408' forward a sufficient distance so that the ejection ends 412 and 412' will project beyond the forward ends of the outer wire and capture members, thereby ejecting the waste portions of wire (FIG. 53). Shortly before the slide mechanism 312 reaches its extreme rearward position, the lower portion of the pivoted fingers 422 and 422' (FIG. 35), mounted to the slide mechanism, will contact two stationary abutment members 426 and 426' mounted on the casting 310 (FIG. 33). Contact between the pivoted fingers and the abutment members, and the continued rearward movement of the slide mechanism 312, will cause the fingers to pivot so that the upper portion of the fingers will move in a direction opposite to the direction of the spring-urged plungers. As the fingers are rotated about their pivots, the upper portion of the fingers will contact the surfaces 418 and 418' of the ejection members (FIG. 55), forcing the ejection members in a rearward direction. The ejection members being in contact with the spring-urged plungers, will force the plungers back into their respective tube housing. By the time the slide mechanism reaches its extreme rearward position, the ejection ends 412 and 412' will be flush with the ends of the outer wire capture members (FIG. 53). The various parts will remain in this position until the slide mechanism 312 is moved forward for another lead inserting operation.

When the slide mechanism is moved forward, pressure of the pivoted fingers 422 and 422' on the ejection members 408 and 408' will gradually be released. At the same time, the ejection members will be pushed forward by the spring-urged plungers until the ejection ends 412 and 412' contact the strands of wire positioned on the inner wire capture members 240 and 240' (FIG. 48). As soon as the ejection members contact the strands of wire, the members stop moving in a forward direction. The slide mechanism 312, with the tubes 424 and 424', will continue to move forward compressing the coil springs provided in the tubes 424 and 424'. When the slide mechanism reaches its extreme position, the ejection ends 412 and 412' will be positioned as shown in FIG. 48, with a portion of the captured wire in space 428 between the ejector end 412 and the inner wire capture member 240.

After the lead inserting operation is completed, the slide mechanism will be pulled back repeating the ejection operation as described. FIG. 43 shows the two inactive positions of the ejection member 408 with relation to the outer wire capture members and the member 369 of the slide mechanism 312. The position shown in solid line is the wire capture position when the slide mechanism is forward, adjacent the commutator and the position shown in broken line is the flush position when the slide mechanism is in its inoperative position.

A means is provided to move the wire capture mechanism a slight distance away from the commutator to provide clearance while armatures are being changed in the machine, without returning the slide mechanism 312 to its retracted inactive position. The sliding bars 344 and 344' (described hereinbefore) positioned under the alignment bars 332 and 332' having the oblique slots 340, 340' provide the means to accomplish the result (FIGS. 33, 34, 36 and 37). This slight outward movement of the wire capture mechanism is simultaneous with the outward horizontal movement of the spindle assembly 10 (described hereinbefore) which provides sufficient space around the armature core C and the commutator B so that the completed armature can be removed and replaced with a new one without damage to any part of the armature or to the wire capture mechanism.

The sliding bars 344 and 344', being provided with the rollers 343 and 343' on their forward ends are also provided with rollers 431 and 431' on their rearward ends shown in phantom in FIG. 36. The two rollers 431 and 431' are adapted to cooperate with two oblique cam slots 432 and 432', respectively, provided in a transverse sliding bar 433, positioned in a guide bed 434 mounted to the machine frame F. The left end (FIG. 36) of the slide bar 433 is connected to a piston rod 435 which is actuated in a horizontal plane by an air cylinder 436, also mounted on the machine frame F.

Immediately after an armature is completed, the air cylinder 436 is actuated causing the piston rod 435 to move the slide bar 433 to the right, as viewed in FIG. 36. The oblique slots 432 and 432' produce a cam action on rollers 431 and 431', causing the sliding bars 344 and 344' to move forward (FIGS. 34 and 36). When the sliding bars 344 and 344' move forward, the rollers 343 and 343', at the forward ends of the bars, will produce a cam action in the oblique slots 340 and 340' formed in the alignment bars 332 and 332', causing the forward ends of the alignment bars to move in opposite directions away from the commutator at the center of the machine. It should be noted here that a slide block and pivot means (not shown) is provided between the alignment bars and the sliding bars 344 and 344', and also that the alignment bars are slightly narrower than the guide tracks 334 and 334' (FIGS. 36 and 37) which provide lateral space in which the alignment bars can pivot to provide the outward movement. The pivot connections between the bars are located on the opposite ends of the same studs on which the cam followers 330 and 330' are mounted.

The open ends 338 and 338' of the alignment bars embracing the cam followers 342 and 342', mounted on the parallel bar assemblies of the spindle S (FIG. 38), move the parallel bar assemblies in a similar fashion away from the commutator at the center of the machine. Through mechanism described hereinbefore, movement of the parallel bar assemblies will be transmitted to the wire capture mechanisms R and R' moving them a short distance away from the commutator to provide the necessary clearance.

After the completed armature has been removed and replaced with a new one, the air cylinder 436 will be actuated in the opposite direction, causing the related members and assemblies to return to their original operating positions to begin another armature winding operation.

*Wire cutoff and lead inserting mechanism*

The wire cutoff and lead inserting mechanism (FIGS. 5, 6, 7 and 8) consists of two assemblies L and L'. Assembly L is located on the left side of the machine (FIG. 5) to cooperate with the wire capture mechanism R (FIG. 38) and the assembly L' is located on the other side of the machine to cooperate with the wire capture mechanism R'. The two assemblies operate in an identical fashion except that they operate in opposite directions. Only one assembly, L', is shown in detail in the drawings and will be described hereinafter. Each of the assemblies have three primary actuating means in the form of actuating arms suitably mounted to the machine frame F. Two of the arms are pivotally mounted and the other arm is mounted in a sliding relation to operate in a vertical plane.

Referring to the drawings, particularly FIGS. 56 and 57, assembly L' comprises a stationary supporting member 440', a horizontally sliding assembly 442', and a bar-selector mechanism 444'. The stationary supporting member 440' is suitably mounted to the machine frame F and is rigidly held in a vertical position with two angularly-shaped members 446'.

The horizontally sliding assembly 442' (FIGS. 58, 59 and 60) is supported, in a dovetail arrangement for a sliding relation on the member 440' and comprises a frame 448', three vertically-movable bars 452', 453', and 454', three radially movable bars 456', 457' and 458', and a longitudinal dovetail mounting member 459'. The dovetail member 459' is permanently mounted to the frame member 448' and provides a means of mounting the assembly 442' on the support member 440', where the dovetail is slidingly positioned in a similarly-shaped supporting track 462' of the member 438', to be actuated in a horizontal plane. The assembly 442' is moved back and forth by an oscillating arm 464', through an adjustable connecting rod 466' pivotally connected to the oscillating arm and to the dovetail member 459'. The oscillating arm 464' is a part of arm 324 which is pivotally mounted to the machine frame F and is oscillated by the main cam shaft M.

Figure 68:
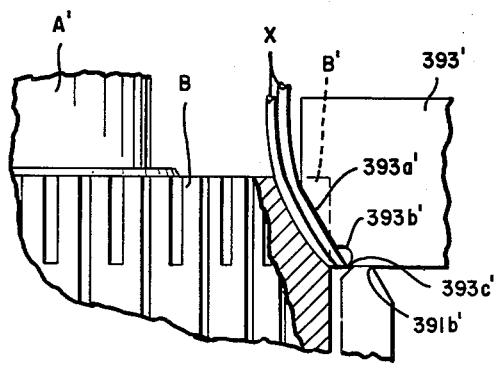
FIG. 68 is a schematic plan view showing the relationship of the commutator slots and the wire cutoff and inserting elements.

The three radial bars 456', 457' and 458' which move radially with respect to the commutator are each provided at their inner ends with relatively thin blades 401', 393' and 402' (described hereinbefore) which cooperate with the wire capture mechanism R' to perform the dual function of cutting the continuous wire strands X, and inserting the severed coil leads or the free ends of the continuous strands into the commutator slots B', as shown in FIG. 68. Since all of the blades have the same function, they all have the same configuration, therefore, only one blade, 393', is described in detail. In FIG. 68, the blade 393' is shown having an oblique forward surface 393A' and an indentation 393b' adjacent thereto. The surface 393a' has approximately the same angularity as the bottoms of the slots B' in the commutator so as to facilitate the positioning of the wires X in the slots, as shown in the drawing. The indentation 393b' is formed in the blade to provide a shearing edge 393c' which cooperates with the shearing edge 391b' of the wire capture mechanism R' to perform the wire cutting operation which frees the coils from the continuous strands or cuts off the small hairpin of waste wire before the free ends of the strands are inserted in the slots at the beginning of a winding cycle.

The three radial bars are also provided with obliquely positioned teeth 469' (FIG. 61) which cooperate in a meshing relation with oblique teeth 468' on the vertical bars, as shown on bars 457' and 453', respectively, in FIG. 61. The oblique teeth on the radial and vertical bars provide a means of moving the radial bars in their respective radial planes when the vertical bars are actuated in their respective vertical planes. The vertical bars are also provided with notches at the lower end of the bars as shown at 453a' in FIG. 61. These notches provide a means of connecting an actuated bar-selector member 474' (FIGS. 62 to 66, inclusive) to the vertical bars.

The bar-selector member 474' is provided with a projection 472' which engages the notches on the vertical bars in a sliding relation. A notch 476' is also provided on the member 474' for sliding engagement with a projection 477' provided on an actuating arm 478'. The arm 478' is actuated in a vertical plane by the main cam shaft M and transmits vertical motion to the member 474'. Vertical motion of member 474' will be transmitted to only two of the vertical bars since the width of member 474' provides that only two of the bars are engaged at one time (FIGS. 62 and 63), which will be better understood from further description hereinafter.

Figure 64:
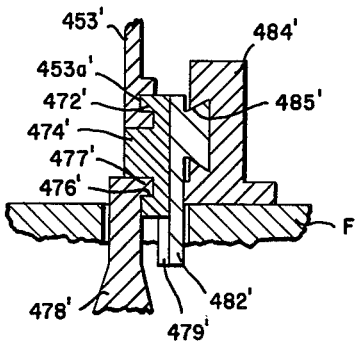
FIG. 64 is a sectional view taken on line 64—64 of FIG. 63.
Figure 65:
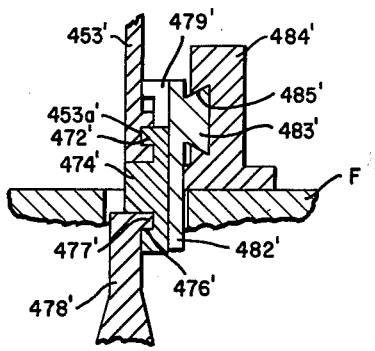
FIG. 65 is a sectional view, similar to FIG. 64, showing various elements in a different operating position.
Figure 66:
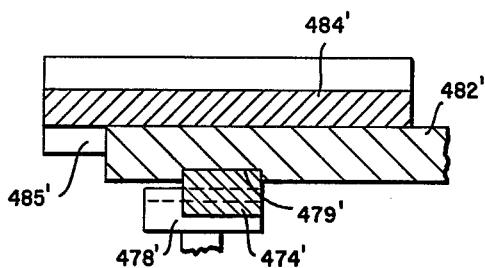
FIG. 66 is a sectional view taken on line 66—66 of FIG. 62.
Figure 67:
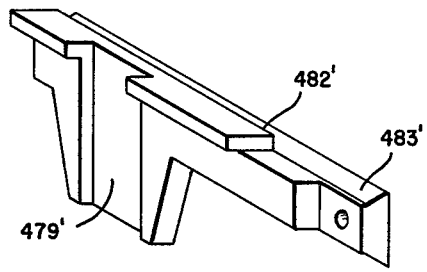
FIG. 67 is an isometric view of a movable guide member shown in FIGS. 62 and 63.

The member 474' is slidingly positioned in a vertical groove 479' provided in a horizontally-actuated member 482' (FIG. 67). The member 482' is provided with a longitudinal dovetail portion 483' which is slidingly positioned in a similarly shaped track 485' provided in a stationary supporting member 484' mounted to the machine frame F (FIGS. 64 and 65). One end of member 482' has an oscillating arm 486' pivotally connected thereto which provides the actuating means to move the member 482' back and forth in a horizontal plane. The arm 486' is pivoted on the machine frame F and oscillated by the main cam shaft M.

During an operating cycle of the wire cutoff and lead inserting mechanism, the assembly 442' is moved from an inactive laterally retracted position to an operating position by the arm 464' (FIG. 56). The inactive retracted position is a sufficient distance laterally from the armature so that rotating members of the spindle S have sufficient clearance to not damage the inserting blades during a winding cycle. After the spindle stops rotating, the assembly 442' is moved toward the commutator to place the inserting blades in an operating position with relation to the wire capture mechanism which has also been moved into its operating position. Assembly 442' with its inserting blades will remain in this position for performing its functions until four trailing coil leads and four leading coil leads have been inserted in the commutator slots.

To perform the first inserting operation, the bar-selector member 474' is moved into engagement with vertical bars 452' and 453' (FIG. 63), and the wire capture mechanism is moved to a "down" position. The vertically-actuated arm 478' is then pulled down by the main cam shaft M pulling the two vertical bars 452' and 453' down (FIG. 65). The oblique teeth 468' provided on the vertical bars cooperating with the oblique teeth 469' on the radial bars 456' and 457' causes the radial bars to move toward the commutator to perform the wire cutting and the lead inserting operations. This operation cuts four coils free from the four continuous strands and inserts the four trailing coil leads of the four coils into four commutator slots two on each side of the armature. Immediately after the blades 401' and 393', on radial bars 456' and 457', have performed their wire cutting and lead inserting operations, they are retracted to their original positions in the assembly 442'.

The armature is then indexed, or replaced, as the case may be, the wire capture mechanism is moved to an "up" position, and the bar-selector member 474' is moved into engagement with the vertical bars 453' and 454' (FIG. 62) by the oscillated arm 486'. The arm 478' is pulled down again by the main cam shaft M pulling the vertical bars 453' and 454' down, causing the radial bars 457' and 458' to move toward the commutator. This operation inserts the four free ends of the four continuous wire strands to begin the winding of four more coils on the armature, at the same time the hairpins of waste wire are severed. After the blades 393' and 402', provided on the radial bars 457' and 458', have performed their wire cutting and lead and end inserting operations, they are retracted to their original positions in the assembly 442'. The assembly 442', with its vertical and radial bars, is then moved back to its retracted inactive position by the arm 464', allowing sufficient clearance for the spindle mechanism to rotate to wind the new coil on the armature. After four more coils are wound on the armature, the assembly 442' will again be moved into its operating position, and the wire cutting and lead inserting operations will be repeated as just described.

*Wire change-over mechanism*

A means is provided in the winding operation to prevent the same strands of wire from occupying the same positions on the wire-capture members in each lead-inserting operation. If the wire strands occupied the same inserting positions in each cycle, some of the coils would have both of their leads inserted in the same commutator slots. As is well known to those skilled in the art, a connecting arrangement such as this would not produce a workable armature, therefore, it is necessary to transpose the wire strands so that they occupy alternate positions on the wire-capture mechanism for each lead-inserting operation. By transposing the wire strands in each cycle, a connecting pattern is developed, as shown in FIGS. 2, 3, 3A, 4 and 4A and described hereinbefore.

Figure 69:
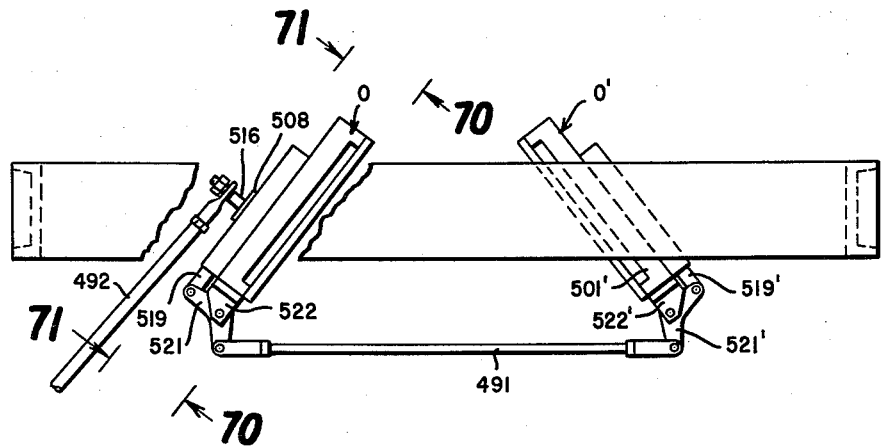
FIG. 69 is a top plan view, partly broken away, showing the wire change-over units.
Figure 70:
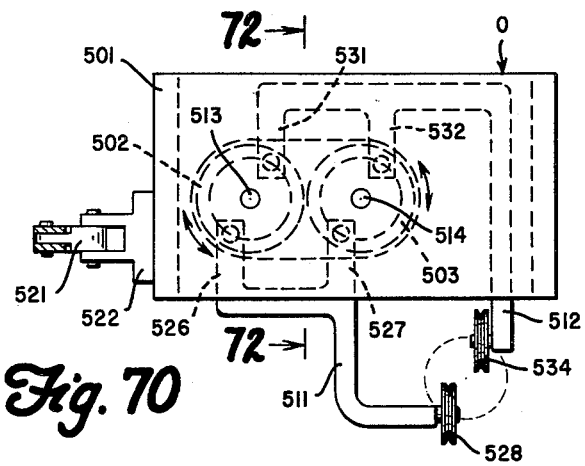
FIG. 70 is a side elevation taken on line 70—70 of FIG. 69 showing the movable elements partly in phantom.
Figure 72:
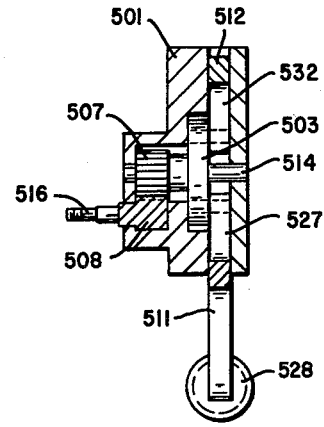
FIG. 72 is a sectional view taken on line 72—72 of FIG. 70.
Figure 71:
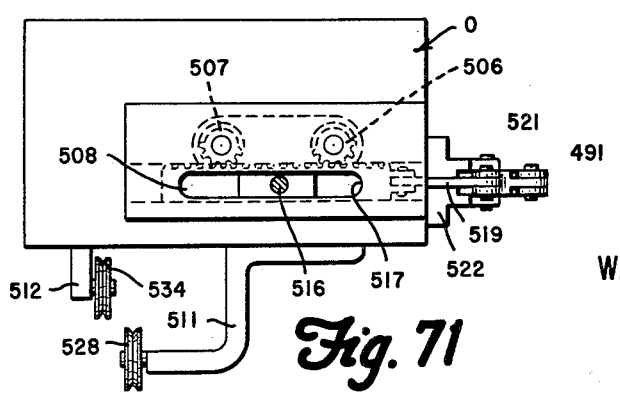
FIG. 71 is a side elevation taken on line 71—71 of FIG. 69.
Figure 78:
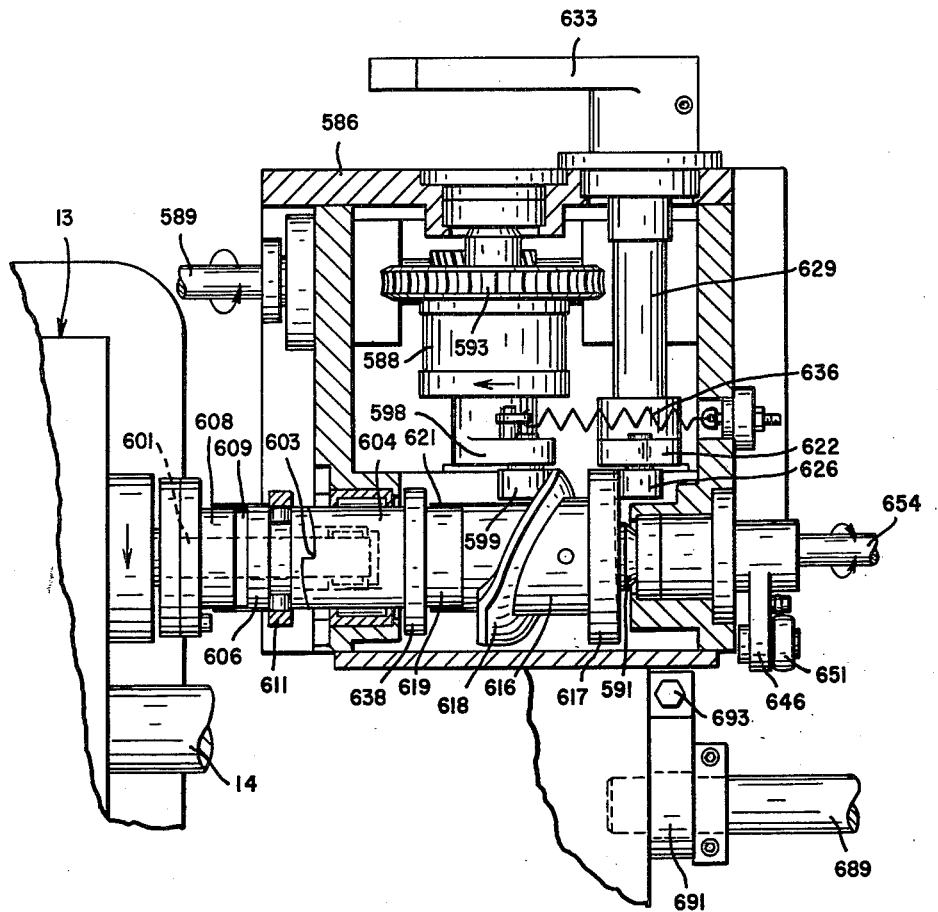
FIG. 78 is a top plan view, partly in section, showing a decelerating mechanism.

A wire change-over mechanism (FIGS. 6, 7, 8 and 69) is provided which will transpose the continuous wire strands X during a winding cycle, so that the individual strands will occupy alternate positions on the wire-capture members 240 and 240'. The wire change-over mechanism comprises two control assemblies 0 and 0' (FIG. 69), driven by a horizontal connecting rod 491, between the assemblies and a horizontal actuating rod 492 driving both assemblies.

The actuating rod 492 is connected to the upper arm of a bell-crank 493 (FIGS. 5, 6 7 and 8) which is pivotally mounted on a fixed pin to vertically-projecting bracket 495 suitably mounted to the machine frame F. The other arm of the ball-crank 493 is connected to a vertical actuating rod 496 which is actuated in an up and down fashion by the main cam shaft M. Both mechanisms 0 and 0' have the same operating characteristics except that they operate in opposite directions as described with references to the other assemblies described hereinbefore. Only mechanism 0 is shown and described in detail (FIGS. 69, 70, 71 and 72).

The wire change-over mechanism 0 comprises a housing 501 (FIG. 70), two spur gears 502 and 503, two pinion gears 506 and 507 (FIG. 71), a gear rack 508, and two oscillating downwardly-projecting arms 511 and 512. The two spur gears 502 and 503, and the two pinion gears 506 and 507 are mounted on shafts 513 and 514, respectively, which are journalled in bearings in the opposite walls of the housing 501. The gear rack 508 is positioned to slide back and forth in the housing 501 and to transmit oscillating motion to the two pinion gears 506 and 507 in mesh therewith. A driving stud 516 is provided on the outer side of the rack 508 which projects through a longitudinal slot 517 in the housing wall and provides a means of connecting the actuating rod 492 to the sliding rack 508.

One end of the rack 508 has connected thereto a link 519 (FIG. 71) which is connected to one arm of a bell-crank 521 pivotally mounted in a bracket 522 which is suitably affixed to the housing 501. The other arm of the bell-crank 521 is connected to one end of the connecting rod 491 which drives mechanism 0'. The motion is transmitted to mechanism 0' through a bell-crank 521', and a link 519' which is connected to a similar gear rack not shown. The bell-crank 521' is pivotally mounted in a bracket 522', also suitably mounted to the housing 501' of mechanism 0'.

The oscillating arm 511 (FIG. 70) is provided with two projecting portions 526 and 527 which are pivotally connected to eccentric pins on the spur gears 502 and 503, respectively, as shown in phantom. A wire-guide pulley 528 is provided on a lower portion of the arm 511 and determines the locus of movement of one of the continuous strands of wire. The oscillating arm 512 is similarly provided with two depending projections 531 and 532, also pivotally connected to eccentric pins on the spur gears 502 and 503, respectively diametrically disposed to the first pair. A similar wire-guide pulley 534 is provided on the lower portion of the arm 512 and determines the locus of movement of the other strand of wire, two strands of wire being guided by each wire change-over mechanism one for each side of the machine.

When the gear rack 508 is actuated by the rod 492, oscillating motion will be transmitted to the arms 511 and 512 through the pinion gears 506 and 507, and the spur gears 502 and 503. The oscillating motion of the arms 511 and 512 will cause each of the wire-guide pulleys 528 and 534 to move about each other in arcs of 180°, as shown in broken line in FIG. 70, where the guide pulleys are pictured in their intermediate positions.

In the operation of the wire change-over mechanisms with relation to the machine, the change-over of the pulleys 528 and 534 occurs during a winding cycle, so that when the spindle stops rotating, and the wire-capture members (FIGS. 46 and 47) are moved into operating position, the wire strands X–1 and X–2 will be in alternate positions from the previous cycle. The change-over movement of the wire-guide pulleys is predetermined, so that they travel through their respective arcs of 180° only once for each winding cycle. During one cycle, they will travel in one direction and, during the next cycle, they will travel in the opposite direction. The relative positions of the wire-guide pulleys is immaterial with reference to the beginning or ending of an armature winding operation. The important factor is that the wire strands are in alternate positions for each lead inserting operation once an armature winding operation has begun.

*The main cam shaft*

The main cam shaft M (FIGS. 73, 74, 75 and 76) is located inside of the machine frame F and is journalled in suitable bearing blocks 541, 542, 543, and 544 mounted to the machine frame. The shaft is driven by a hydraulic motor 546 through a speed reduction mechanism 547, and gears 548 and 549. Symmetrically mounted on the shaft with reference to the center of the machine are two large drum cams 551 and 551', two smaller drum cams 552 and 552', and two face cams 553 and 553'. The left end of the shaft (FIG. 73) is provided with a sprocket 556 which, through a chain 557, drives a sprocket 558 mounted on a short shaft 559. The shaft 559 is journalled at one end in a suitable bearing block 561 which is also mounted to the machine frame F. The other end of shaft 559 is provided with an eccentric member 562 which is connected to the vertically-actuated rod 496, described hereinbefore (FIG. 6), which operates the wire change-over mechanisms 0 and 0'.

The large drum cam 551 is provided with a relatively small surface cam 564 and an edge cam 566 (FIGS. 75 and 76). The surface cam 564 provides vertical motion to the rod 176 through a pivoted arm 567, which is pivotally mounted to the machine frame and is provided with a cam follower 568. Actuation of rod 176 provides horizontal movement to the spindle assembly 10 to move the assembly to the left (FIG. 13) which provides clearance in the armature-holding fixtures 70 and 70' for various operations as described hereinbefore. The edge cam 566 provides oscillating motion to the bifurcated arm 200 through a pivoted arm 569 suitably mounted to the machine frame F, the arm 569 being provided with a cam follower 571. The bifurcated arm 200 is moved in one direction by the edge cam 566 and spring-urged in the opposite direction by a coil spring 572 (FIG. 76) which is mounted on one end of an adjusting screw 573 positioned in the wall of the machine frame. Actuation of the bifurcated arm 200 operates the armature-indexing mechanism shown in FIGS. 21 and 22.

The opposite large drum cam 551' is provided with a similar edge cam 576 (FIG. 73), which provides oscillating motion to an arm 577 having a cam follower 578. The arm 577 is mounted on the shaft 162 and controls the operation of the armature guide pin 152, shown in FIG. 20.

The large drum cams 551 and 551' principally control the positioning of the wire cutoff and lead-inserting mechanisms L and L' through the oscillated cams 464 and 464' (FIG. 56). The arm 464 is provided with a cam follower 465, and the arm 464' is provided with a cam follower 465'. Integral with the arm 464' is the arm 324 which controls the positioning of the main slide mechanism W through the connecting rod 322 (FIG. 5) as already described.

Figure 39:
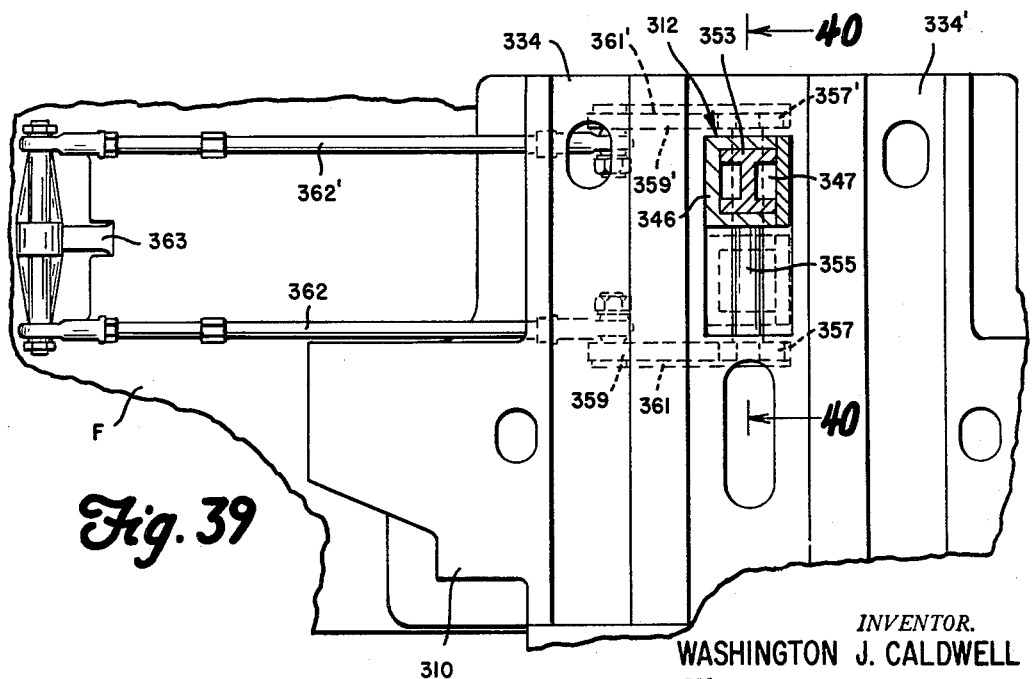
FIG. 39 is a top plan view of a portion of the machine showing actuating means for the vertical movement of certain elements shown in FIG. 38.
Figure 40:
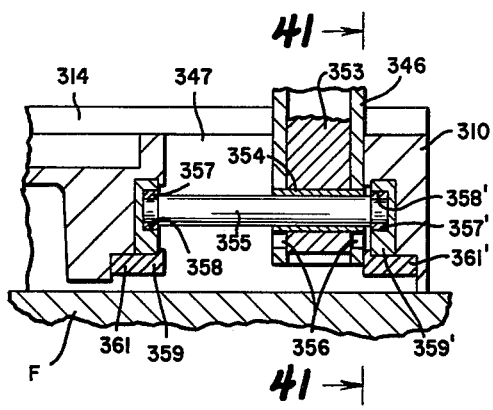
FIG. 40 is a sectional elevation taken on line 40—40 of FIG. 39.
Figure 41:
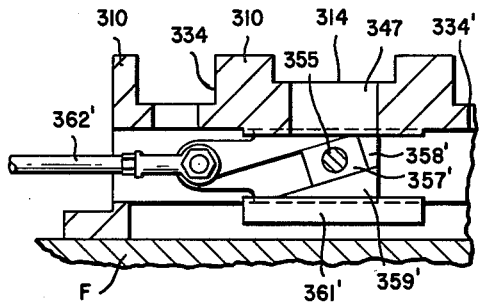
FIG. 41 is a sectional elevation taken on line 41—41 of FIG. 40.

The small drum cams 552 and 552' oscillate arms 486 and 486' to position the control mechanism in the assemblies L and L' which determines the sequence in which the lead-inserting fingers will be operated (FIGS. 62 and 63). The arm 486 is provided with a cam follower 487, and the arm 486' is provided with a cam follower 487'. Also oscillated by the small drum cam 552 is the arm 363 (FIG. 74) which controls the vertical position of the wire capture mechanism through the connecting rods 362 and 362' (FIG. 39).

The face cams 553 and 553' provide oscillating motion to two bifurcated members 581 and 581' suitably journalled to the frame as shown in FIG. 73. The member 581 is provided with a cam follower 582 on one of its arms, and the member 581' is provided with a cam follower 582' on one of its arms. The other arm of each of the bifurcated members 581 and 581' has connected thereto the vertically-actuated arms 478 and 478' respectively, which operate the wire cutoff and lead-inserting fingers of the mechanisms L and L' (FIGS. 61, 62, and 63).

The main shaft M is rotated in one direction only, as shown by the arrow in FIG. 74, and is rotated in timed relation with the spindle mechanism S. The timing is such that when the spindle S is rotating, the cam shaft M is idle; when the cam shaft M is rotating, the spindle S is idle. The chart in FIG. 77 shows the operating relation between the various cams on the shaft M with relation to the beginning of an armature-winding operation. The chart is self-explanatory to those experienced in the art, and will not be described further.

*Decelerating mechanism*

A deceleration control mechanism H is provided on the machine (FIGS. 5, 8, 78, 79 and 80) which controls the rotational speed at stopping of the spindle S and also insures that when the spindle is stopped it is locked in a predetermined position. In an automatic machine of this type, it is important that the armature, after being rotated to wind coils thereon, be stopped in exactly the same position for each lead-inserting operation, so that the coil leads will be accurately inserted in the proper commutator slots. Also, in a high speed machine of the type described it is important that the machine is decelerated and finally stopped in a relatively short period of time without jamming which might damage the various rotating members.

The decelerating mechanism is located in a housing 586 (FIGS. 5, 8 and 78) mounted on the top surface of the machine frame F. The mechanism includes a speed control clutch 588 (FIGS. 78 and 79), a constant speed drive shaft 589, geared to the clutch, and a cam shaft 591.

The clutch 588 is a conventional over-running clutch unit having a driven end and a driving end. The driven end has mounted thereto a worm wheel 593 which cooperates with a worm gear 594 mounted on the constant speed drive shaft 589. The shaft 589 is driven by an electric motor 596 (FIGS. 5 and 8) through a conventional speed reduction unit 597. The driving end of the clutch 588 has mounted thereto a crank arm 598 provided with a cam follower 599. In the instant case, the driving end of the clutch becomes a progressive stop rather than an actual driving means, which will be better understood hereinafter.

The cam shaft 591 (FIGS. 78 and 79) is journalled in suitable bearings mounted in two opposite walls of the housing 586. Power to rotate the cam shaft is supplied by the gear assembly 12 (FIG. 9) through a projecting drive shaft 601. Rotation of the shaft 601 is in direct relation to the rotation of the spindle S, that is, the shaft 601 rotates only when the spindle S rotates and approximately at one half the speed of the spindle. A disengaging drive connection is provided between the shaft 601 and the cam shaft 591 in the form of a ratchet clutch 603, formed between an integral portion 604 of the cam shaft and a longitudinally-slidable sleeve 606. The opposite end of the sleeve 606 cooperates with a member 608, mounted on the drive shaft 601, to provide a longitudinally displaceable drive coupling 609. The sleeve 606 is actuated back and forth by a pivoted bifurcated lever 611 urged in one direction by a coil spring 612 and in the opposite direction by a solenoid 614 (FIGS. 5, 8 and 79) whose armature coacts with link 614A.

A second sliding sleeve 616 is provided on the cam shaft 591, having two integral spaced cams 617 and 618. One end of the sleeve 616 also cooperates with an integral portion 619 of the cam shaft 591 to provide a second longitudinally-displaceable drive coupling 621. The sleeve 616 is displaced on the cam shaft by the opposing actions of the two crank arms 622 and 598 reacting on the cams 617 and 618 through cam followers 626 and 599 respectively. The crank arm 622 is mounted on a shaft 629 and is urged toward the crank arm 598 by the return-spring of a hydraulic valve 631 controlling the main hydraulic motor 16 acting on a lever 633, adjustably mounted on the shaft 629. The crank arm 598, described hereinbefore, is constantly urged toward the crank arm 622 by a coil spring 636, anchored at one end to a wall of the housing 586.

A third cam 638 is provided on the cam shaft 591 which cooperates with a cam follower 639, mounted on a crank arm 641, to rotate a suitably journalled shaft 642, which operates a locking mechanism to be described hereinafter.

In the operation of the decelerating mechanism, the electric motor 596 is allowed to run continuously even though the main spindle S of the machine may be idle. Continuous operation of the motor 596 will provide continuous rotation to the driving end of the over-running clutch 588 through the shaft 589, worm 594, and worm wheel 593. When the spindle S of the machine is rotating, the energized solenoid 614, through the action of the bifurcated arm 611, is maintaining the ratchet clutch 603 disengaged. As long as the ratchet clutch 603 is disengaged, the cam shaft 591 does not rotate, allowing the crank arms 622, 598, and 641 to remain in the positions shown in FIG. 79.

When a winding operation on a set of coils on the armature is about to end, the solenoid 614 is deenergized to release the bifurcated arm 611. The coil spring 612 will then cause the bifurcated arm to pivot, sliding the sleeve 606 to the left (FIG. 79), so that the cooperating members of the ratchet clutch 603 will become engaged for a driving relation. Through the automatic electric control system of the machine, deenergization of the solenoid 614 is timed so that when the spindle S begins its last revolution the bifurcated arm 611 will be released. The instant the ratchet clutch 603 is in driving engagement, the drive shaft 601 will slowly rotate the cam shaft 591 in a counterclockwise direction (FIG. 79).

When the cam shaft 591 begins to rotate, the configuration of the cam 618 causes the cam follower 599 and crank arm 598 to rotate in an arc in the same direction as the worm wheel 593 about the axis of the over-running clutch 588. The instant the crank arm 598 begins to rotate at an angular speed faster than the speed of the worm wheel, a driving connection is established between the driven end and the driving end of the over-running clutch causing the clutch to lock to provide an interim or progressive stop. The worm and worm wheel assembly, provided at the opposite end of the clutch 588, are irreversible, and therefore prevents the crank arm 598 from rotating the worm wheel 593. For this reason, the angular speed of rotation of the crank arm 598 is dependent on the angular speed of rotation of the worm wheel 593 and any increase in this angular speed causes locking of the clutch which allows the shaft 591 to rotate the spaced cams 617 and 618 against the interim stop of cam follower 599 to operate the control valve 631 of the main hydraulic motor 16 as will appear hereinafter. The maximum speed of rotation of the crank arm 598 is therefore capable of being automatically controlled by the speed of rotation of the shaft 589 and worm 594. Since the rotating speed of the shaft 589 is extremely slow, rotation of the crank arm 598 will also be very slow.

Figure 79:
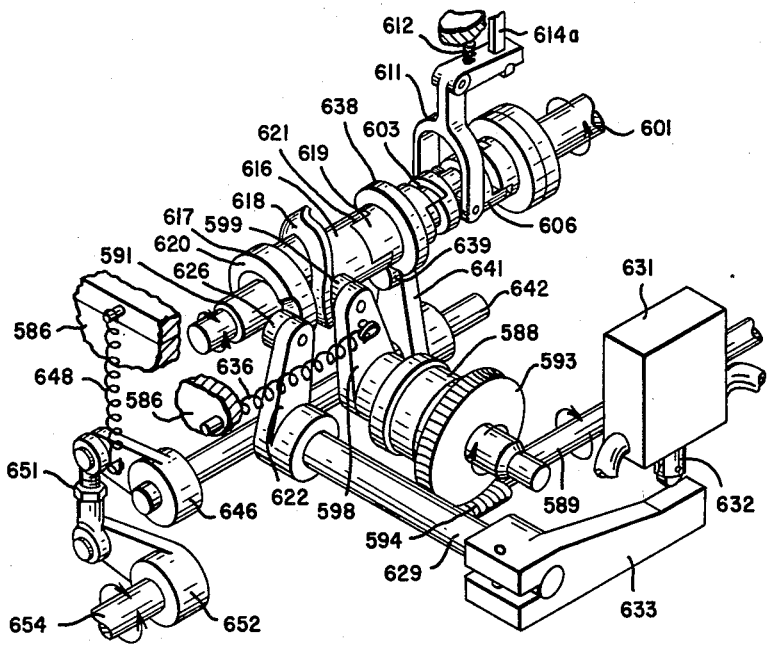
FIG. 79 is an isometric view of the mechanism shown in FIG. 78 and taken from the upper right-hand corner of FIG. 78.

The configuration of the cam 618 when it is rotating faster than the cam follower 599 is allowed to advance to cause a locking situation, the sleeve 616 integral with the cams 617 and 618 will then be forced to the left (as viewed in FIG. 79). The cam 617 is provided with an inclined surface 620 which is in contact with the cam follower 626 on the end of arm 622. The longitudinal and rotational movement of the cam 617 against the cam follower 626 will cause the crank arm 622 to gradually rotate the shaft 629 about its axis, to cause lever 633 to contact a valve-actuating member 632 and gradually close the hydraulic valve 631. If the speed of rotation of the shaft 601 is greater than the maximum allowed by the control mechanism, the rate of closing of the valve 631 is increased by the longitudinal movement of the cams 618 and 617 along the shaft 591, which throttles down the speed of the hydraulic motor 16, which is reflected again in the resulting speed of rotation of shaft 601. Closing of the valve 631 will stop the hydraulic motor 16 (FIG. 5), which then causes the spindle S to stop.

The method, as described, for gradually closing the hydraulic valve 631 at a predetermined rate provides a means of gradually stopping the machine at a predetermined deceleration, regardless of the temperature of the hydraulic fluid or the operating conditions of the machine. As stated hereinabove, it is important that the machine be stopped by this method to prevent damage to any of the rotating shafts or relative parts which rotate at high speed.

Simultaneously with the operation of the decelerating mechanism, a locking mechanism is being actuated to position the spindle S in a predetermined angular relation, the locking mechanism preventing rotation in either direction of the driving means for the spindle. As the cam shaft 591 is being slowly rotated by the drive shaft 601, the integral cam 638 coacting with the cam follower 639 mounted on the crank arm 641 is causing the shaft 642 to rotate about its axis. The shaft 642 projects through the housing 586 and is provided with a second crank arm 646 at its opposite end. The crank arm 646 is urged in a clockwise direction by a coil spring 648 (FIG. 79) against the action of the cam 638. The opposite end of the coil spring 648 is anchored to the housing 586. An adjustable connecting link 651 is provided that connects the crank arm 646 to another crank arm 652 mounted on a shaft 654. The crank arm 646, connecting link 651, and crank arm 652 transmit rotary motion from the shaft 642 to the shaft 654.

The opposite end of shaft 654 (FIG. 80) is provided with a trigger member 656 and a second crank arm 658 in spaced relation. The trigger member 656 is positioned on the shaft 654 for limited angular rotation, with relation to the shaft, against the bias of a coil spring 661 having one of its ends connected to the shaft and its other end connected to the trigger member 656. A sear 663 projects from the trigger member 656 and cooperates with one end of a centrally pivoted arm 664 to raise a locking member 666 into a locking position. The locking member 666 is provided with a slot 667 cooperating with a headed end on the pivoted arm 664. The member 666 is positioned in a suitable block (not shown) which is mounted to the machine frame F and provides a guide means for the member 666 to be actuated up and down in a vertical plane. An inclined surface 668 is provided on the upper end of the member 666 which cooperates with the annular surface 671 of a cam 673, providing a means of moving the member 666 downward out of a locking position when the cam is rotated in a clockwise direction. The cam 673 is mounted on the drive shaft 14 (FIGS. 5, 9, and 10) and has a notch 674 which coacts with the pawl member 666 to provide a means of preventing accidental reverse or counterclockwise rotation of the drive shaft 14 as a result of the spring-back of the torsion bar 689.

The crank arm 658 is mounted to the shaft 654 and is provided with a pivoted member 676 having a bell-crank configuration. The member 676 has a projection 678, the lower surface of which contacts the top end of a pin 681, also mounted in a suitable block (not shown) for sliding motion in a vertical plane. The top surface of the projection 678 contacts a notch 682 provided in a disk member 683 which is also mounted on the drive shaft 14. The notch 682 and the projection 678 cooperate to prevent continued rotation in a clockwise direction of the drive shaft 14 due to momentum when the spindle S is being stopped.

The lower end of the sliding pin 681 contacts a flat surface 686 provided on a crank arm 688 which is mounted to the free end of a suitably journalled torsion bar 689. The opposite end of the torsion bar 689 has a similar arm 691 mounted thereto, which is provided with an adjustable stop member 693. The adjustable stop member 693 contacts a stop block 696 suitably mounted on the machine frame F.

The torsion bar 689 and the shaft 654 are both journalled for rotary motion in suitable bearing block supports (not shown) mounted on the machine frame F. The trigger member 656 and the bell-crank member 676 are both provided with vertical projections 657 and 677 respectively, which actuate switches (not shown) included in the automatic electrical control system.

When the spindle S is rotating, the projection 678 on the bell-crank member 676 is clear of the notch 682, and the locking member 666 is also clear of the notch 674. When the spindle S is being decelerated, the cam 638 on the cam shaft 591 causes the shaft 654 to rotate in a counterclockwise direction. Rotation of the shaft 654 moves the crank arm 658 in a counter-clockwise direction positioning the projection 678 over the top end of the pin 681. At the same time, the coil spring 661, being anchored to the shaft 654, has caused sear 663 of the trigger member 656 to bear against the adjacent end of the arm 664. Continued rotation of the shaft 654 causes the arm 664 to rotate about its pivot and push the locking member 666 upwardly so as to be in contact with the outer surface 671 of cam 673. The locking member 666 will contact the cam surface 671 before the shaft 654 reaches its limit of rotation causing the coil spring 661 to absorb additional tension to actuate the trigger member 656.

As the drive shaft 14 nears the end of its last revolution, the notch 682 of the disk 683 will contact the projection 678. This contact will rotate the bell-crank member 676 and force the pin 681 downwardly against the arm 688 tending to rotate the torsion bar 689. Since the opposite end of the torsion bar is prevented from rotating by the arm 691, the final stopping shock of the rotating masses is absorbed by the torsion bar 689.

Figure 80:
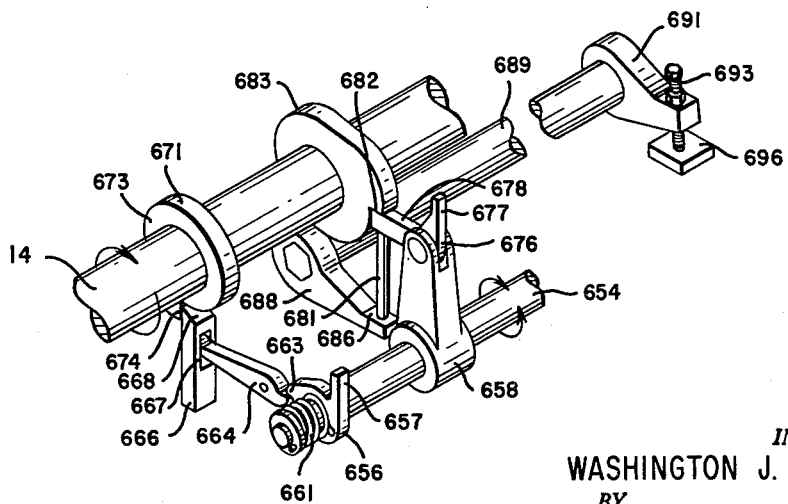
FIG. 80 is an isometric view of a locking and shock-absorbing mechanism operated by the mechanism shown in FIGS. 78 and 79.

Simultaneously with the notch 682 contacting the projection 678, the cam 673 will have rotated far enough to position the notch 674 in line with the locking member 666. The additional tension stored in the coil spring 661 then reacts on the trigger member 656 and arm 664 to snap the locking member 666 into the notch 674. It can easily be seen that the final position of the locking members, as shown in FIG. 80, will prevent the drive shaft 14 from rotating in either direction.

After the spindle is stopped for a lead-inserting operation, or a shutdown period, the various parts of the decelerating mechanism and the locking mechanism will remain in their respective operating positions until the sleeve 349 of the main slide mechanism 312 is moved forward to encircle the end of the armature shaft (FIG. 34. As the sleeve 349 encircles the end of the armature shaft to maintain the armature in a given horizontal plane, the solenoid 614 will be energized to pivot the bifurcated arm 611 in the opposite direction to disengage the ratchet clutch 603. As soon as the ratchet clutch 603 is disengaged, freeing the cam shaft 591, the cam follower 599, mounted on the spring-urged crank arm 598 and bearing against the cam 618, will cause the cam shaft 591 to rotate in the opposite direction. Reverse rotation of the cam shaft 591 will cause the cams 620 to 638 to react on the crank arms 622 and 641, simultaneously releasing the hydraulic valve 631 and disengaging the locking member 678 from the notch 682.

The valve 631 is further controlled by the automatic electrical system which will not allow the hydraulic motor to operate until a lead-inserting operation is completed. Releasing the valve 631 and disengaging the lock member 678 from the notch 682 before a lead-inserting operation is completed allows the shaft 14 to respond immediately to transmit rotation to the spindle S when the lead-inserting operation is completed. When the drive shaft 14 begins to rotate, the locking cam 673 mounted thereon will cam the locking member 666 downwardly to a nonoperative position. The drive shaft 14 will continue to rotate driving the spindle S through another winding cycle. After a predetermined number of turns of wire have been wound on the armature, the decelerating mechanism will again be actuated to stop the spindle S and lock the drive shaft 14 in a predetermined rotary position until the main slide mechanism moves forward and the sleeve 349 encircles the end of the armature shaft, after which another cycle will be repeated as described.

It is to be understood that the above detailed description of the present invention is intended to disclosed an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What I claim is:

1. In an armature winding and connecting machine, the combination of a holding means for an unwound armature assembly consisting of a shaft, a slotted armature core and a slotted commutator, said holding means holding means holding the armature assembly in a predetermined initial position for predetermined periods during a winding cycle, rotating means cooperating with the holding means to rotate the armature assembly in an end-over-end fashion, at least a pair of means one co-operating with each opposite side of the slotted commutator to sever a pair of continuous strands of wire and insert the free ends of the continuous strands of wire in commutator slots on each side of the commutator, guide means for positioning the continuous strands of wire from extraneous sources in adjacent slots in the armature core during the rotative period of the armature by the rotating means, control means cooperating with the rotating means to stop the armature at the predetermined initial position after a predetermined number of revolutions to form an armature coil, said control means also initiating a new severing and inserting step for the pair of means cooperating with the commutator to sever the already-wound coils and insert the trailing ends of the coils in commutator slots and means cooperating with the pair of means cooperating with the commutator to maintain a grip on the free ends of the commutator strands after the already-wound coil has been severed from the continuous strands.

2. In an armature winding and connecting machine, the combination of a holding means for an unwound armature assembly consisting of a shaft, a slotted armature core and a slotted commutator, said holding means holding the armature assembly in a predetermined starting position for predetermined periods during a winding cycle, rotating means cooperating with the holding means to rotate the armature assembly in an axis transverse of the shaft, means to hold the ends of at least a pair of continuous wire strands in aligned cooperative relation with slots in the commutator on each side thereof, at least a pair of means moving in various radial planes to cooperate with each side of the slotted commutator to sever the pairs of continuous strands of wire and insert the free ends of the continuous strands of wire in the commutator slots on each side of the commutator, guide means for positioning the continuous strands of wire from extraneous sources in adjacent slots in the armature core during the rotating period of the armature by the rotating means, control means cooperating with the rotating means to stop the armature at the predetermined starting position after a predetermined number of revolutions to wind an armature coil, said control means also initiating a new severing and inserting step for the pair of means cooperating with the commutator, means cooperating with the means to hold the ends of the continuous strands cooperating with the commutator to grip the new free ends of the strands after the already-wound coils has been severed from the continuous strands, and means for indexing the armature assembly for aligning new slots in the armature core with the guide means, said control means thereafter initiating a new severing and inserting step of the pair of means cooperating with the commutator for beginning a new winding cycle.

3. In an armature winding and connecting machine, the combination of a separable holding means for an unwound armature assembly consisting of a shaft, a slotted armature core and a slotted commutator, said holding means holding the armature assembly in a predetermined starting position for predetermined periods during a winding cycle, rotating means cooperating with the holding means to rotate the armature assembly in an end-over-end fashion, a pair of means movable into cooperation in one plane with each side of the slotted commutator to grip a pair of continuous strands of wire on each side of the commutator, and to sever one strand on each side and insert the free ends of the continuous strands of wire in commutator slots said pair of means being movable in other radial planes to sever the second strand on each side of the commutator and insert the free ends of the strands in other commutator slots guide means for positioning the continuous strands of wire from extraneous sources in pairs in adjacent slots in the armature core during the rotating period of the armature by the rotating means, control means cooperating with the rotating means to stop the armature at the predetermined starting position after a predetermined number of revolutions to form four armature coils, said control means also initiating new severing and inserting steps for the pair of means cooperating with the commutator for severing the four coils from the continuous strands and inserting the trailing ends of the coil in four separate commutator bars by the movement in several radial planes, means cooperating with the pair of means cooperating with the commutator to maintain a grip on the free ends of the continuous strands after the already-wound coils have been severed from the continuous strands and means for indexing the armature assembly for aligning new slots in the armature core with the guide means, said control means thereafter initiating a new severing and inserting step of the pair of means cooperating with the commutator for beginning a new winding cycle.

4. In a machine for winding an armature assembly having a commutator with slots therein, a means for holding four strands of continuous wire in a position wherein a portion of each wire is aligned with a slot in the commutator, and means moving from a lateral direction with reference to the commutator having portions movable in several radial planes for simultaneously severing the continuous strands of wire and substantially simultaneously inserting the ends of the severed wire in slots in the commutator.

5. In a machine for winding an armature assembly having a commutator with slots therein, a combination comprising a means for holding the ends of a pair of continuous strands of wire, means for aligning a portion of said continuous strands with a pair of adjacent slots of the commutator, means for simultaneously severing the continuous strands adjacent the portion being held and inserting the ends of the severed strands into the slots in the commutator, and means for reversing the relative position of the continuous strands.

6. In a machine for winding an armature assembly having a commutator with slots therein, a combination comprising a means for holding four continuous strands of wire, two on each side of the commutator, means for holding a first of said pair of wires on each side of the commutator in alignment with diametrically opposed slots, means moving in one radial plane with reference to the commutator for simultaneously severing said wires and inserting one end of each of the severed wires in slots in the commutator, and means moving in other radial planes for severing and inserting each of the second of said pairs of wires in other slots in said commutator in timed relation with the first severing and inserting operation.

7. In a machine for winding an armature assembly having a commutator with slots therein, a combination comprising a means for holding a pair of continuous strands of wire on each side of the commutator in alignment with adjacent commutator slots on each side, means moving in one radial plane of the commutator for substantially simultaneously severing one of each of said pair of wires on each side and inserting one of the ends of the severed wire in diametrically-opposed slots in the commutator, other means operating in a second radial plane for substantially simultaneously severing the second wire on each side and inserting one end thereof in other slots of the commutator, means to maintain a hold on the new ends of the continuous strands of wire, means for aligning the new ends of the continuous strands with two new slots on each side of the commutator, and means moving in new radial planes on each side of the commutator for severing the new ends of the four continuous strands at the portion being held and inserting the ends of the continuous strands in the four new slots of the commutator.

8. In a machine for winding an armature assembly having a commutator with slots therein, a means for contacting and holding a pair of strands of continuous wire including a pair of interlocking members in a position wherein a portion of each of the wires is aligned with slots in adjacent relation in the commutator by parallel surfaces on the members, and means moving from a lateral direction with reference to the members and the commutator in alignment with the slots in the commutator for severing the continuous strands of wire and substantially simultaneously inserting one end of each of the severed wires in its slot in the commutator, said interlocked members retaining a hold on the other ends of the severed wires.

9. In a machine for winding an armature assembly having a commutator with slots therein, a combination comprising interlocking members for holding four continuous strands of wire, two on each side of the commutator, means for holding a first of said pair of wires on each side of the commutator in alignment with a slot, means moving in one radial plane with reference to the commutator for simultaneously severing said wire and inserting one end of each of said severed wire in slots in the commutator while retaining a hold on the second ends, means moving in other radial planes for severing and inserting ends of said second wire of each pair in other slots in said commutator in timed relation with the first severing and inserting operation, while retaining a hold on said second ends of said second pair, and means for guiding and winding the pairs of wires on the armature to form the active coils thereof.

10. In a machine for winding an armature assembly having a commutator with slots therein, a combination comprising a means for holding a pair of continuous strands of wire including a pair of interlocking members on each side of the commutator, means moving in one radial plane of the commutator for substantially simultaneously severing one of said pair of wires and inserting one of the ends of the severed wires in slots in the commutator while the interlocking members retain a hold on the other ends of the wire, a second means operating in other radial planes for substantially simultaneously severing the second wire of each pair and inserting one end thereof in other slots of the commutator while the interlocking members retain a hold on the other ends of the second pair of wires, means to maintain a hold on the new ends of the continuous strands of wire and move the interlocking members to a new position, means for aligning the new ends of the continuous strands with two new slots in the commutator, means moving in two new radial planes on each side of the commutator for severing the new ends of the four continuous strands at the portion being held and inserting the ends of the continuous strands in the four new slots of the commutator, and means to wind the continuous strands on the armature to form coils thereon.

11. In a machine for winding an armature assembly having a commutator with slots therein, the combination comprising a means including interlocking members for holding a pair of continuous strands of wire on each side of the diametrically-opposed commutator one of each pair being held in alignment with commutator slots, means moving in one radial plane of the commutator for substantially simultaneously severing one of each of said pair of wires and inserting one of the ends of the severed wire in aligned slots on each side of the commutator, a second means operating in radial planes for substantially simultaneously severing the second wire of each pair and inserting one end thereof in other adjacent slots of the commutator, means to maintain a hold on the new ends of the continuous strands of wire by the interlocking members, means including the interlocking members for aligning the new ends of the continuous strands with two new slots in the commutator, means moving in two new radial planes on each side of the commutator for severing the new ends of the four continuous strands at the portion being held and inserting the ends of the continuous strands in the four new slots of the commutator, means for ejecting the severed held portions of the strands from the machine, and means to wind the strands on the armature to form coils thereon.

12. In a machine for automatically winding and connecting the coils of an armature assembly having a commutator with slots therein, means for winding two continuous strands in coils in the slots on each side, means for gripping the continuous strands on each side of the commutator and holding them in a position wherein a portion of each wire of the continuous strands is aligned with slots in adjacent relation in the commutator, means moving from a lateral direction with reference to the commutator for severing the aligned portions of the continuous strands of wire and substantially simultaneously inserting the ends of the severed portion of wires in the slots in the commutator, said means for gripping the continuous strands of wire maintaining a grip on the ends of the continuous strands, means for indexing the armature to a new position, means for inserting said last ends in other adjacent commutator slots to start a new winding cycle, and means for reversing the relative position of the individual wires of the pairs of wires during the winding cycle with reference to the gripping means.

13. In a machine for automatically winding and connecting the coils of an armature assembly with core slots and having a commutator with slots therein, means for performing the coil winding on each side of the armature core in its slots with pairs of wires, means for intermittently holding the four strands of continuous wire in pairs in a position wherein a portion of each wire of the continuous strand is aligned with a slot in the commutator, means moving from a lateral direction with reference to the commutator having portions movable in several radial planes aligning with the commutator slots for simultaneously severing the continuous strands of wire and substantially simultaneously inserting the ends of the severed wire portions in the slots of the commutator, said holding means retaining a hold on the ends of the continuous strands, means to move the holding means to align the end portions of the four continuous strands with commutator slots, means to insert the ends in the commutator slots to start a new winding cycle, and means cooperating with the holding means for reversing the relative position of the wires during the winding in each of the pairs of wires of the continuous strands with reference to the holding means.

14. In a machine for winding and connecting an armature assembly suitable for use with a dynamoelectric machine including a slotted armature core and a kerfed bar commutator having two bars for each armature slot, means for winding a pair of coils on each side of the armature in adjacent core slots in relative diametrically-opposed relation with reference to the armature core from continuous strands, means for connecting the leading ends of a first of each pair of coils on opposite sides of the armature to diametrically-opposed commutator bars of the commutator, means for connecting the leading ends of the second of each pair of said coils on opposite sides of the armature to adjacent commutator bars relatively positioned one above the diametrically-opposed bar to which the first leading ends are connected, means for connecting the trailing ends of the first of the first pair of strands on opposite sides of the armature to commutator bars positioned one bar below the aforementioned diametrically-opposed bars, means for connecting the trailing ends of the second of the pair of coils on opposite sides of the armature to the commutator bars diametrically-opposed, and means for transposing the relative positions of said strands on each side of the armature during the winding cycle.

15. In a machine for automatically winding and connecting an armature assembly suitable for use with a dynamoelectric machine including a slotted armature core and a kerfed bar commutator having two bars for each armature slot, means for winding a pair of coils on each side of the armature in adjacent core slots in relative diametrically-opposed relation with reference to the armature core from continuous strands, means for connecting the leading ends of a first of each pair of coils on opposite sides of the armature to diametrically-opposed commutator bars of the commutator, means for connecting the leading ends of the second of each pair of said coils on opposite sides of the armature to adjacent commutator bars relatively positioned one above the diametrically-opposed bars to which the first leading ends are connected, means for severing the wound coils on the armature, means for connecting the trailing ends of the first of the first pair of strands on opposite sides of the armature to commutator bars positioned one bar below the aforementioned diametrically-opposed bars, means for connecting the trailing ends of the second of the pair of coils on opposite sides of the armature to the commutator bars diametrically-opposed, means for transposing the relative positions of said strands on each side of the armature during the winding cycle, and means for driving the separate means for automatic operation.

16. In a machine for automatically winding and connecting an armature assembly suitable for use with a dynamoelectric machine including a slotted armature core and a commutator having two bars for each slot in the armature core, means for winding active coils on each side of the armature from continuous strands of wire positioned in pairs of adjacent core slots in diametrically-opposed relation, means for connecting the leading ends of a first coil of the pair of coils to commutator bars which are positioned in diametrically-opposed relation, means for connecting the leading ends of the second of said pair of coils to commutator bars positioned adjacent and relatively above the said diametrically-opposed commutator bars, means for connecting the trailing ends of the first pair of coils to adjacent commutator bars which are positioned relatively below the diametrically-opposed bars, means for connecting the trailing ends of the second pair of coils in superposed relation in the bars which are diametrically-opposed, and means for causing automatic operation of said means to wind all of the remaining coils of the armature on the armature core and connecting all of the coils in the same pattern to the bars of the commutator.

17. In a machine for automatically winding and connecting an armature assembly suitable for use with a dynamoelectric machine including a slotted armature core and a commutator having two bars for each slot in the armature core, means for winding active coils on each side of the armature from continuous strands of wire positioned in pairs of adjacent core slots in diametrically-opposed relation, means for connecting the leading ends of a first coil of the pair of coils to commutator bars which are positioned in diametrically-opposed relation, means for connecting the leading ends of the second of said pair of coils to commutator bars positioned adjacent and relatively above the said diametrically-opposed commutator bars, means for connecting the trailing ends of the first pair of coils to adjacent commutator bars which are positioned relatively below the diametrically-opposed bars, means for connecting the trailing ends of the second pair of coils in superposed relation in the bars which are diametrically-opposed, means for transposing the relative position of the strands relative to the commutator, means for indexing the armature to bring new pairs of core slots to the winding position, and means for causing automatic operation of said means to wind all of the remaining coils of the armature on the armature core and connecting all of the coils in the same pattern to the bars of the commutator.

18. In a machine for automatically winding and connecting an armature assembly suitable for use with a dynamoelectric machine including a slotted armature core and a commutator having two bars for each slot in the armature core, means for winding active coils on each side of the armature from continuous strands of wire positioned in pairs of adjacent core slots in diametrically-opposed relation, means for indexing the armature to bring new pairs of slots to the winding position, means for connecting the leading ends of a first coil of the pair of coils to commutator bars which are positioned in diametrically-opposed relation before winding the coil, means for connecting the leading ends of the second of said pair of coils to commutator bars positioned adjacent and relatively above the diametrically-opposed commutator bars also before winding the coil, means for severing the strands, means for connecting the trailing ends of the first pair of coils already connected to adjacent commutator bars which are positioned relatively below the diametrically-opposed bars, means for connecting the trailing ends of the second pair of coils in superposed relation in the bars which are diametrically-opposed, means for transposing the relative position of the strands relative to the commutator, and means for causing automatic operation of said means to wind all of the remaining coils of the armature on the armature core and connecting all of the coils in the same pattern to the bars of the commutator.

(References on following page)

References Cited by the Examiner

UNITED STATES PATENTS

| | | | |
|---|---|---|---|
| 2,074,366 | 3/37 | Collins et al. | 29—205 |
| 2,424,301 | 7/47 | Moore | 242—13 |
| 2,448,672 | 9/48 | Knauf | 140—92.2 |
| 2,942,793 | 6/60 | Moore | 242—13 |

FOREIGN PATENTS 583,044  9/59  Canada.

CHARLES W. LANHAM, *Primary Examiner.*

RICHARD A. WAHL, RICHARD F. PURDY,
*Examiners.*